(12) United States Patent
Morita et al.

(10) Patent No.: US 7,459,516 B2
(45) Date of Patent: Dec. 2, 2008

(54) POLYKETONE FIBER AND PROCESS FOR PRODUCING THE SAME

(75) Inventors: Toru Morita, Nobeoka (JP); Hitoshi Yamazaki, Nobeoka (JP); Jinichiro Kato, Nobeoka (JP); Teruhiko Matsuo, Nobeoka (JP)

(73) Assignee: Asahi Kasei Fibers Corporation, Osaka-Shi (JP)

( * ) Notice: Subject to any disclaimer, the term of this patent is extended or adjusted under 35 U.S.C. 154(b) by 333 days.

(21) Appl. No.: 10/525,452

(22) PCT Filed: Aug. 27, 2003

(86) PCT No.: PCT/JP03/10873

§ 371 (c)(1),
(2), (4) Date: Feb. 24, 2005

(87) PCT Pub. No.: WO2004/020707

PCT Pub. Date: Mar. 11, 2004

(65) Prior Publication Data

US 2006/0128933 A1    Jun. 15, 2006

(30) Foreign Application Priority Data

Aug. 29, 2002  (JP)  ............... 2002-252070

(51) Int. Cl.
| | |
|---|---|
| C08G 16/00 | (2006.01) |
| B60C 9/00 | (2006.01) |
| D01F 6/28 | (2006.01) |
| D01F 6/30 | (2006.01) |

(52) U.S. Cl. ............ 528/220; 528/225; 528/486; 525/153; 525/539

(58) Field of Classification Search ............ 528/220, 528/225, 486; 525/153, 539
See application file for complete search history.

(56) References Cited

U.S. PATENT DOCUMENTS

| | | | |
|---|---|---|---|
| 5,045,258 A | 9/1991 | van Breen et al. | |
| 5,194,210 A | 3/1993 | Lommerts et al. | |

FOREIGN PATENT DOCUMENTS

| | | |
|---|---|---|
| EP | 1 116 752 A1 | 7/2001 |
| JP | WO 00/09611 | 2/2000 |
| JP | 2000-345431 | 12/2000 |
| JP | 2001-146641 | 5/2001 |
| JP | 2001-295134 | 10/2001 |
| JP | 2002-235241 | 8/2002 |
| JP | 2002-235242 | 8/2002 |
| TW | 591138 B | 6/2004 |
| WO | WO 90/14453 | 11/1990 |
| WO | WO 94/16127 | 7/1994 |
| WO | WO 94/20562 | 9/1994 |
| WO | WO 99/18143 | 4/1999 |

*Primary Examiner*—Duc Truong
(74) *Attorney, Agent, or Firm*—Finnegan, Henderson, Farabow, Garrett & Dunner, L.L.P.

(57) ABSTRACT

Polyketone fibers comprising, on the basis of the entire repeating units, 95% by mole of a repeating unit of the formula (1) shown below, and showing a minimum value ($A_{min}$ (F)) of a UV absorbance of 0.5 or less in a wavelength region of 210 to 240 nm.

—$CH_2CH_2$—CO—                                (1)

12 Claims, 2 Drawing Sheets

25mmφ

230.5mm

US 7,459,516 B2

POLYKETONE FIBER AND PROCESS FOR PRODUCING THE SAME

FIELD OF THE INVENTION

The present invention relates to polyketone fibers and a process for producing the same.

BACKGROUND ART

It has been known that polymerization of carbon monoxide with an olefin such as ethylene and propylene, in the presence of a complex of a transition element such as palladium and nickel as a catalyst, gives a polyketone in which carbon monoxide and an olefin are substantially and completely alternately copolymerized (Industrial Material, 5, Dec., (1997)).

Because polyketone fibers show a high strength and a high elastic modulus, and are excellent in dimensional stability and bondability, they are expected to be applied to industrial material fibers such as reinforcing fibers for tires and belts, and reinforcing fibers for plastics. For example, research in automobile tires has been intensively carried out in recent years, and it has been considered that use of organic fibers having a small specific gravity compared with that of a steel and showing a high strength and a high elastic modulus as a reinforcing material for tires is effective in energy saving.

Polyketone fibers are fibers showing a high tensile strength and a high tensile elastic modulus as well as organic fibers extremely excellent in bondability to a rubber. Polyketone fibers are a new material highly adaptable for use as a rubber-reinforcing material such as tire cords.

In particular, a polyketone formed out of a repeating unit of ethylene and carbon monoxide is similar to a polyethylene and a poly(vinyl alcohol) in that the molecular chain of a polyketone can take an in-plane zigzag conformation. As a result, the molecular chain can be highly oriented by drawing to give fibers showing a high tensile strength and a high tensile elastic modulus to such a degree that the fibers are termed super fibers. Moreover, the polyketone fibers thus obtained are excellent in retention of a tensile strength and a tensile elastic modulus and dimensional stability at high temperature.

However, because a polyketone is drastically modified in a molten state, melt spinning a polyketone is difficult. Dry spinning or wet spinning in which forming is conducted while a polyketone is being dissolved in a solvent has, therefore, been investigated as a method of forming the polyketone into fibers.

For example, Japanese Unexamined Patent Publication (Kokai) No. 2-112413 discloses that polyketone fibers showing a tensile strength of 13.0 cN/dtex and a tensile elastic modulus of 206 cN/dtex are obtained by carrying out wet spinning with an organic solvent such as hexafluoroisopropanol or m-cresol, and hot drawing the spun yarn at a high draw ratio.

Furthermore, the pamphlets of International Publication Nos. 99/18143 and 00/09611 disclose methods of spinning a polyketone with an aqueous metal salt solution. For example, polyketone fibers showing a tensile strength of 11.6 cN/dtex and a tensile elastic modulus of 275 cN/dtex are obtained by wet spinning with an aqueous zinc chloride/sodium chloride solution used as a solvent, and hot drawing the resultant yarn at a high draw ratio.

Methods of spinning a polyketone with an aqueous metal salt solution used as a solvent are considered to be preferable for the following reasons. The solvent is prepared at low cost, is non-combustible, shows low toxicity, and is excellent in safety in the production process, spinning stability and solvent recovery.

Furthermore, in order to increase a tensile strength and a tensile elastic modulus of polyketone fibers, various spinning methods have been investigated. For example, Japanese Patent Publication No. 4-505344 discloses a wet spinning method in which an organic solvent is used, and by which polyketone fibers showing a tensile strength of 12 cN/dtex or more and a tensile elastic modulus of 250 cN/dtex or more are obtained by hot drawing a yarn of polyketone fibers that has an organic solvent as a residue prior to drawing. Moreover, the pamphlet of International Publication No. 02/068738 discloses, as a wet spinning method in which an aqueous metal salt solution is used as a solvent, a method of producing polyketone fibers showing a tensile strength of 12 cN/dtex or more and a tensile elastic modulus of 250 cN/dtex or more, the method comprising gel spinning a polyketone solution (spinning stock solution) having a phase separation temperature, cleaning, drying and hot drawing the spun yarn.

However, it has been found that modification of a polyketone proceeds by the formation of a furan ring in a high temperature atmosphere through a Paal-Knorr reaction, or by a chemical reaction such as an intramolecular or an intermolecular crosslinking by aldol condensation. Even a slight amount of a modified polymer generated during the production process of polyketone fibers causes yarn breakage and fluff formation during hot drawing. When the polymer modification is significant, the tensile strength and the tensile elastic modulus of the yarn are sometimes lowered. In particular, it has been found that when a polyketone is in an oxidizing, acidic or basic atmosphere and, for example, when a polyketone is contacted with a solvent in the above atmosphere, a problem, that a polyketone is likely to be modified even at low temperatures, arises.

In wet spinning with an organic solvent, in order to obtain polyketone fibers showing a still higher tensile strength and a still higher tensile elastic modulus, polyketone fibers must be drawn at high temperatures exceeding 150° C. while hexafluoroisopropanol remains in the fibers prior to drawing even when a solvent such as hexafluoroisopropanol that dissolves a polyketone at relatively low temperatures is used (Japanese Patent Publication No. 4-505344). However, because such a method accelerates modification of a polyketone, a problem, that the fibers thus obtained often show fluff formation and yarn breakage, arises. Moreover, when a solvent of m-cresol or resorcin/water is used, the problem that polymer modification is produced arises because the polyketone dissolves in the solvent at high temperatures exceeding 80° C.

Even in wet spinning with an aqueous metal salt solution used as a solvent, there is a problem about polymer modification, and various examinations have been performed to inhibit the modification. For example, the pamphlet of International Publication No. 00/09611 discloses that, in wet spinning with an aqueous metal salt solution used as a solvent, reduction of amounts of palladium, etc., that are residues of the polymerization catalyst and are contained in the polyketone and reduction of amounts of zinc, etc, that are components of the solvent and are contained therein decrease polymer modification produced during hot drawing, improve a tensile strength and a tensile elastic modulus, and are effective in suppressing yarn breakage. It is considered that the results are obtained because palladium and zinc are substances that accelerate modification of a polyketone with heat. Moreover, Japanese Unexamined Patent Publication (Kokai) No. 2001-123326 discloses that when polyketone fibers are allowed to contain specific additives to inhibit polymer modification and lowering of a polymer molecular weight during hot drawing, the effect of improving a tensile strength is obtained.

However, in the process for producing polyketone fibers with an aqueous metal salt solution used as a solvent, a polymer modification produced by heating a polyketone with a solvent particularly causes disadvantages. When conventional technologies as explained above alone are applied, a variation in the tensile strength of the resultant polyketone fibers is sometimes increased, and the heat resistance thereof is sometimes deteriorated.

Furthermore, for example, in the step of twisting a yarn of polyketone fibers in order to use the yarn as tire cords that are a principal application of the fibers, the stability of the yarn during treatment of the yarn after the production of the fibers sometimes causes problems, for example, fluffs in the yarn are often formed. When fluffs are formed during twisting the yarn, problems, such as lowering of the cord tenacity and significant lowering of the tensile strength of the cords that are in rubber products such as tires and that suffer repeated elongation and compression, arise.

Moreover, in order to increase the productivity of polyketone fibers while the installation cost is being taken into consideration, drawing the yarn at a high speed with a heating zone that is made as short as possible is advantageous, that is, hot drawing at a high strain rate is advantageous. However, in the conventional production process, hot drawing the yarn at a high strain rate in a high draw ratio range where the physical properties of a high tensile strength and a high elastic modulus are manifested causes the following problems: fluffs are formed during drawing; the tensile strength and tensile elastic modulus are markedly lowered in comparison with the yarn of polyketone fibers that is drawn at a low strain rate in the same draw ratio.

Furthermore, the present inventors have found that in order to inhibit the polyketone modification in a solvent, it is extremely important to adjust the temperature and period of not only the step of dissolving the polyketone but also the steps in which the polyketone is contacted with a solvent until the solution is injected into a coagulation bath. However, although preceding references such as the pamphlets of International Publication Nos. 99/18143, 00/09611 and 02/068738 and Japanese Unexamined Patent Publication (Kokai) No. 2001-123326 describe the temperature and period in the dissolution step, they do not describe at all the conditions in steps subsequent to the dissolution such as a filtering step and a solution-feeding step in a tubing. The above fact indicates that no one has recognized that, in order to industrially stably produce polyketone fibers, inhibition of a polymer modification in a solvent is an extremely important factor.

Furthermore, it is effective to measure a UV absorbance as an index of a polymer modification in a trace amount produced by heating a polyketone contacted with a solvent. However, no preceding references exist that describe the relationship between a degree of a polymer modification shown by a UV absorbance and properties of the polyketone fibers.

DISCLOSURE OF THE INVENTION

The following problems are solved by the present invention.

1) The present invention provides polyketone fibers showing a decreased variation in a tensile strength, excellent in a heat resistance, producing decreased fluffs in the twisting step, and exhibiting an excellent fatigue resistance.

2) The present invention provides a process for producing polyketone fibers that produces decreased fluffs caused by single filament breakage when hot drawing in a high draw ratio is conducted at a high strain rate, and that show decreased lowering of a tensile strength and a tensile elastic modulus in comparison with polyketone fibers that are hot drawn at a low strain rate in the same above draw ratio.

The present inventors have fully studied the frequency of fluff formation during hot drawing, variations in the tensile strength and tensile elastic modulus and the stability of the twisting step against the production conditions such as heating temperatures and treating periods in the production steps in which the polyketone is contacted with the solvent, namely, in dissolving the polyketone, filtering the resultant polyketone solution, feeding the filtered solution, and injecting the filtered solution through a spinneret. As a result, they have discovered that excellent polyketone fibers can be obtained by inhibiting modification of the polyketone for a period from dissolving the polyketone in a solvent to injecting the polyketone solution through a spinneret so that the modification thereof is made to fall in a proper range, and the above problems have thus been solved. They have thus achieved the present invention.

That is, the present invention is as described below.

1. Polyketone fibers comprising a polyketone that contains 95% by mole or more, on the basis of the total repeating units, of a repeating unit represented by the formula (1) shown below, and showing a minimum value of a UV absorbance ($A_{min}(F)$) observed in a wavelength region of 210 to 240 nm of 0.5 or less.

$$—CH_2CH_2—CO—  \qquad (1)$$

2. The polyketone fibers according to 1 mentioned above, wherein the polyketone fibers show a tensile strength of 10 cN/dtex or more and a tensile elastic modulus of 200 cN/dtex or more.

3. The polyketone fibers according to 1 or 2 mentioned above, wherein the polyketone fibers show an $A_{min}(F)$ of 0.3 or less.

4. The polyketone fibers according to any one of 1 to 3 mentioned above, wherein the polyketone fibers show a tensile strength of 12 cN/dtex or more and a tensile elastic modulus of 250 cN/dtex or more.

5. The polyketone fibers according to any one of 1 to 4 mentioned above, wherein the polyketone fibers show a tensile strength of 15 cN/dtex or more and a tensile elastic modulus of 300 cN/dtex or more.

6. The polyketone fibers according to any one of 1 to 5 mentioned above, wherein the number of filaments is from 100 to 5,000, and the number of fluffs is 10 or less per 10,000 m.

7. The polyketone fibers according to any one of 1 to 6 mentioned above, wherein the polyketone fibers show a heat-resistant tensile strength retention of 75% or more.

8. A process for producing polyketone fibers, wherein a polyketone solution prepared by dissolving a polyketone that contains 95% by mole or more, on the basis of the total repeating units, of a repeating unit represented by the formula (1) shown below in an aqueous solution containing at least one metal salt selected from the group consisting of a zinc salt, a calcium salt and a thiocyanic acid salt is used, and the polyketone in the polyketone solution injected through a spinneret shows a minimum value of a UV absorbance $A_{min}(S)$ observed in a wavelength region of 210 to 240 nm of 0.5 or less.

$$—CH_2CH_2—CO—  \qquad (1)$$

9. A process for producing polyketone fibers, wherein a polyketone solution prepared by dissolving a polyketone that contains 95% by mole or more, on the basis of the total repeating units, of a repeating unit represented by the formula (1) shown below in an aqueous solution containing at least one metal salt selected from the group consisting of a zinc salt, a calcium salt and a thiocyanic acid salt is used, and when a period (assumed to be P minutes) from dissolving the polyketone in the aqueous metal salt solution to injecting the polyketone solution through a spinneret is divided into minutes and the arithmetic mean of a heating temperature at t−1 minutes from dissolution of the polyketone and a heating temperature at t minutes therefrom is represented by $T_t(K)$, the following formula (2) is satisfied.

$$-CH_2CH_2-CO- \tag{1}$$

$$S = \sum_{t=1}^{t=p} 1.53 \times 10^8 \times [\exp(-8547/T_t)] \leq 1.00 \tag{2}$$

wherein t in (2) is a natural number from 1 to P (minutes), provided that when there is a fraction of less than 1 minute in the period from dissolving the polyketone in the aqueous metal salt solution to injecting the polyketone solution through a spinneret, the fraction is eliminated with the resultant period being P.

10. The process for producing polyketone fibers according to 9 mentioned above, wherein the following formula (3) is satisfied:

$$S = \sum_{t=1}^{t=p} 1.53 \times 10^8 \times [\exp(-8547/T_t)] \leq 0.60 \tag{3}$$

11. The process for producing polyketone fibers according to 9 or 10 mentioned above, wherein the aqueous metal salt solution is an aqueous solution in which a zinc salt and a metal salt other than a zinc salt are mixed, and the polyketone subsequent to injecting the polyketone solution through a spinneret is coagulated, cleaned, dried and hot drawn.

12. The process for producing polyketone fibers according to 11 mentioned above, wherein the hot drawing temperature is from 100 to 300° C., and the total hot draw ratio is 7 or more.

13. The process for producing polyketone fibers according to any one of 9 to 12 mentioned above, wherein the temperature of the polyketone solution injected through the spinneret is from 60 to 100° C.

14. The process for producing polyketone fibers according to any one of 9 to 13 mentioned above, wherein the temperature in the dissolution step is from 10 to 60° C., and the dissolution period is 10 hours or less.

15. The process for producing polyketone fibers according to any one of 9 to 14 mentioned above, wherein the polyketone solution has a phase separation temperature of 0 to 250° C.

16. The process for producing polyketone fibers according to 15 mentioned above, wherein the phase separation temperature is from 10 to 150° C.

17. The process for producing polyketone fibers according to any one of 9 to 16 mentioned above, wherein the polyketone solution contains 50 ppm or less of palladium based on the weight of the polymer.

18. The process for producing polyketone fibers according to any one of 9 to 17 mentioned above, wherein the aqueous metal salt solution contains from 10 to 60% by weight of a zinc salt.

19. The process for producing polyketone fibers according to 11 mentioned above, wherein the total sum of metal elements originating from the solvent remaining in the polyketone fibers prior to hot rolling is 500 ppm or less based on the weight of the polymer.

20. A twisted yarn cord formed out of the polyketone fibers according to any one of 1 to 7 mentioned above, and having a twist factor K represented by the following formula is from 1,000 to 30,000:

$$K = Y \times D^{0.5}$$

wherein Y is a number of twist (T/m) per m of the twisted yarn cord, and D is the total size (dtex) of the yarn prior to twisting.

21. The twisted yarn cord according to 20 mentioned above, wherein the tensile strength is 5 cN/dtex or more.

22. A treated cord prepared by imparting a resorcin-formalin-latex resin to the twisted yarn cord according to 20 or 21 mentioned above.

23. A fiber-reinforced composite material containing the polyketone fibers according any one of 1 to 7 mentioned above.

24. The fiber-reinforced composite-material according to 23 mentioned above, wherein the fiber-reinforced composite material is a tire or a belt.

The present invention is explained below in detail.

A polyketone forming the polyketone fibers of the present invention contains 95% by mole or more of a repeating unit of the above formula (1) based on the total repeating units. The polyketone may contain repeating units other than that of the above formula (1) in a range of less than 5% by mole, for example, it may contain a repeating unit of the following formula (4):

$$-R-CO- \tag{4}$$

wherein R is such an organic group other than ethylene having 1 to 30 carbon atoms as propylene, butylene or 1-phenylethylene. R also may naturally be at least two types, for example propylene and 1-phenylethylene may be present in a mixture.

In view of a high tensile strength and a high tensile elastic modulus that are attainable and in view of excellent retention of a tensile strength and a tensile elastic modulus at high temperature, the polyketone contains preferably 98% by mole or more, more preferably 99.6% by mole or more of a repeating unit of the above formula (1) based on the total repeating units.

Although there is no specific limitation on the intrinsic viscosity [η] of the polyketone fibers, the polyketone fibers tend to show a higher tensile strength and a higher heat resistance when the intrinsic viscosity is higher. The intrinsic viscosity [η] is preferably 2 dl/g or more, and more preferably 3 dl/g or more.

The polyketone fibers of the present invention show a minimum value of a UV absorbance ($A_{min}(F)$) observed in a wavelength region of 210 to 240 nm of 0.5 or less. In addition, the method of measuring $A_{min}(F)$ is described later. UV absorption spectra measured in Examples are shown in FIGS. 1 and 2 as references.

$A_{min}(F)$ having a larger value shows the presence of a larger amount of polymer modified products formed by an intermolecular or intramolecular crosslinking reaction, or the like reaction, of the polyketone caused by Aldol condensation, or the like. When $A_{min}(F)$ exceeds 0.5, the polyketone fibers show a large variation in the tensile strength, much fluff formation in the twisting step, and lowering of a fatigue resistance. It is considered that the results are brought about because the fiber portions, in which polymer modified products, are present are embrittled and weakened. In order to further decrease a variation in the tensile strength, suppress fluff formation in the twisting step, and improve a fatigue resistance, $A_{min}(F)$ is preferably 0.3 or less, and more preferably 0.2 or less.

As explained above, in order to make industrial materials such as tires and belts lightweight, and in order to make the dimensional change thereof small when a load is applied thereto, the reinforcing fibers preferably show a higher tensile strength and a higher tensile elastic modulus.

The polyketone fibers of the invention preferably show a tensile strength of 10 cN/dtex or more and a tensile elastic modulus of 200 cN/dtex or more. The tensile strength is more preferably 12 cN/dtex or more, still more preferably 15 cN/dtex or more and most preferably 17 cN/dtex or more. The tensile elastic modulus is more preferably 250 cN/dtex or more, still more preferably 300 cN/dtex or more and most preferably 350 cN/dtex or more.

The tensile strength and tensile elastic modulus are each measured 20 times at a pulling speed of 20 cm/min using fiber samples each 20 cm long. The averages of the measured values are defined as the tensile strength and the tensile elastic modulus of the fibers, respectively. In general, polyketone fibers showing a higher tensile elastic modulus are likely to show a larger variation in the tensile strength. However, the polyketone fibers of the present invention have the excellent advantage of showing a high tensile elastic modulus and a small variation in the tensile strength.

The polyketone fibers of the present invention have a single filament size of preferably 0.01 to 10 dtex and more preferably 0.5 to 3 dtex. Moreover, the polyketone fibers have a total size of preferably 30 to 100,000 dtex and more preferably 100 to 5,000 dtex. When the single filament size and the total size are in the above ranges, stabilized spinning can be conducted, and polyketone fibers showing a high tensile strength and a high tensile elastic modulus are obtained.

The number of fluffs of the polyketone fibers of the invention is preferably 10 or less per 10,000 m, more preferably 5 or less per 10,000 m and still more preferably 1 or less per 10,000 m. When the polyketone fibers are used as industrial materials such as tire cords, excessive fluffs cause the problem that troubles occur during treatments after production of the fibers such as twisting to a low productivity.

The polyketone fibers of the present invention show heat-resistant tensile strength retention of preferably 75% or more, more preferably 80% or more, and still more preferably 85% or more. Industrial materials such as tire cords may sometimes be used over a long period of time in a state exceeding 100° C. The heat-resistant tensile strength retention of the polyketone fibers is therefore preferably high. In addition, the measurement method of a heat-resistant tensile strength retention is as explained later.

For the polyketone fibers of the present invention, the content of palladium in the fibers originating from a polymerization catalyst of the polyketone is preferably small, because the heat resistance of the polyketone fibers is increased. The content of palladium in the polyketone fibers is preferably 50 ppm or less, more preferably 30 ppm or less and still more preferably 10 ppm or less.

The maximum heat shrinkage stress of the polyketone fibers of the invention is preferably from 0.01 to 0.7 cN/dtex. When the maximum heat shrinkage stress is excessively high, the following problems arise: package tightening takes place during winding, and the resultant package is hardly taken out from the winder; the polyketone fibers are shrunk to produce a strain in the product shape during treatment or use, and in some cases a product deformation significantly deteriorates the product properties. On the other hand, when the maximum heat shrinkage stress is excessively low, shape fixing by heat setting during treatment cannot be adequately effected, and relaxation, during forming the product, tends to take place. Accordingly, the maximum heat shrinkage stress is preferably from 0.01 to 0.6 cN/dtex, more preferably from 0.02 to 0.5 cN/dtex and still more preferably from 0.03 to 0.3 cN/dtex.

A finishing agent is imparted to the fiber surface of the polyketone fibers of the present invention in an amount of preferably 0.2 to 7% by weight based on the weight of the fibers, more preferably 0.5 to 3.5% by weight and still more preferably 0.7 to 1.5% by weight. When the imparted amount of a finishing agent is in the above range, the following advantages are obtained: the abrasion resistance of the fibers is improved; the resistance of the fibers during running in spinning process is suitable, and contamination of rolls, hot plates, guides, and the like, caused by sticking of the finishing agent thereto is reduced. Part of the finishing agent may naturally penetrate to the interior of the fibers.

When a finishing agent is imparted to a yarn, the dynamic friction coefficient (herein after abbreviated to μ) between yarns is made suitable. μ is preferably from 0.01 to 3.0, more preferably from 0.1 to 2.7 and still more preferably from 0.1 to 2.5. When μ is excessively small, slippage of the yarn takes place during the twisting step, and an adequate number of twisting cannot be imparted to the yarn. Moreover, when μ is excessively large, the dynamic friction between yarns becomes excessively large, and the yarns are susceptible to be damaged in the twisting step. As a result, the fatigue resistance of the fibers is likely to be lowered.

In the present invention, the finishing agent is a treatment agent that is a liquid or solid material, and that sticks to a yarn surface and/or a surface layer portion to improve the surface conditions of the yarn. Although there is no specific restriction on the types of finishing agents to be used, it is preferred that the finishing agent contain at least one of the following compounds (A) to (C) as an essential component in a total amount of 30 to 100% by weight based on the finishing agent:

(A) an ester compound having a molecular weight of 300 to 2,000;

(B) a mineral oil; and (C) $R^1$—O—$(CH_2CH_2O)_n$—$(CH(CH_3)CH_2O)_m$—$R^2$ wherein $R^1$ and $R^2$ are each selected from a hydrogen atom and organic groups each having 1 to 50 carbon atoms, n and m are selected from 1 to 500 respectively, and ethylene oxide units and propylene oxide units may be block copolymerized or random copolymerized.

Furthermore, in order to impart antistatic properties to a yarn of the polyketone fibers, a known acid salt such as a phosphoric acid salt, a phosphorous acid salt, a sulfonic acid salt and a carboxylic acid salt may be added to a finishing agent in an amount of 0.5 to 20% by weight.

When such a finishing agent is imparted to a yarn of the polyketone fibers, a firm oil film is formed on the surface of a yarn of the polyketone fibers, and the oil film makes the yarn surface suitably smooth. As a result, the yarn is never worn in a short period even when the yarn is twisted.

Next, a process for producing the polyketone fibers of the present invention is explained below.

The chemical structure (monomer composition) of a polyketone (hereinafter referred to as a raw material polyketone sometimes) used for the production of the polyketone fibers of the invention is the same as the polyketone forming the polyketone fibers of the invention.

A raw material polyketone having a higher intrinsic viscosity [η] is likely to give polyketone fibers showing a higher tensile strength and a higher tensile elastic modulus. The intrinsic viscosity [η] of the raw material polyketone is preferably from 1 to 20 dl/g, more preferably from 2 to 15 dl/g, and still more preferably from 4 to 10 dl/g. When [η] is in the above range, the polyketone shows good solubility and spinnability, and gives fibers showing a high tensile strength.

A known process for producing a polyketone can be used as the process for producing the raw material polyketone with or without a modification. For example, carbon monoxide and ethylene can be polymerized and synthesized to give the raw material polyketone, in the presence of a catalyst containing a compound of a group IX or X transition element, a phosphorus-type bidentate ligand of the formula (5) shown below and an acid having a $pK_a$ of 4 or less.

$$R^3R^4P-R^5-PR^6R^7 \qquad (5)$$

wherein $R^3$, $R^4$, $R^6$ and $R^7$ are each independently an organic group having 1 to 30 carbon atoms, and $R^5$ is an organic group having 2 to 5 carbon atoms.

Examples of the group IX or X transition element include palladium and nickel. In view of polymerization activation, palladium is particularly preferred. In order to use palladium for the catalyst, a carboxylic acid salt of palladium is preferred, and palladium acetate is particularly preferred.

Furthermore, for the phosphorus-type bidentate ligand, at least one of $R^3$, $R^4$, $R^6$ and $R^7$ is a substituted phenyl group, and the phenyl group preferably contains at least one alkoxy group in a position ortho to the bonded phosphorus. Specifically, an o-methoxyphenyl group and an o-ethoxyphenyl group are preferred. When a non-substituted phenyl group is employed, the molecular weight distribution of the resultant polyketone sometimes becomes excessively large.

$R^5$ bonding two phosphorus atoms is preferably a trimethylene group.

Examples of the acid having a $pK_a$ of 4 or less include trifluoroacetic acid, sulfuric acid, difluoroacetic acid, trichloroacetic acid and p-toluenesulfonic acid.

A catalyst comprising a compound of a group IX or X transition element, a phosphorus-type bidentate ligand and an acid having a $pK_a$ of 4 or less is added to a lower alcohol such as methanol or ethanol. Carbon monoxide and ethylene are introduced into the solution, and polymerization is carried out. The molar ratio of carbon monoxide to ethylene is preferably 5:1 to 1:5.

A compound of a group IX or X transition element used as a catalyst is used preferably in an amount of $10^{-8}$ to 0.1 mole in terms of the metal element per mole of ethylene used for polymerization. In order to achieve the object of the present invention, it is particularly preferred to determine a charging amount of a compound of a group IX or X transition element so that a palladium mass becomes 50 ppm or less based on the total mass of the polyketone thus obtained. Moreover, in view of polymerization activity, the phosphorus-type bidentate ligand is used in an amount of preferably 0.1 to 20 moles per mole of a compound of a group IX or X transition element, and more preferably 1 to 3 moles. Furthermore, an acid having a pKa of 4 or less is used in an amount of preferably 0.1 to 1,000 moles per mole of a compound of a group IX or X transition element, and more preferably 1 to 50 moles.

The polymerization temperature is preferably from 60 to 150° C., and the polymerization pressure is preferably from 4 to 20 MPa. When the polymerization temperature is in the above range, a polymer having a suitably narrow molecular weight distribution is obtained.

In order to maintain catalyst activity during polymerization, a quinone such as 1,4-benzoquinone and 1,4-naphthoquinone may be added in an amount of 0.1 to 500 moles per mole of the catalyst metal element.

The polyketone thus obtained is preferably subjected to the following procedure: the polyketone is separated by filtering; the polyketone is then cleaned so that the remaining catalyst and oligomer present in a trace amount are removed, and an amount of palladium remaining in the polymer and the molecular weight distribution are adjusted in preferred ranges; and the polyketone is dried. Examples of the cleaning solvent used for cleaning include an alcohol such as methanol, ethanol and propanol, an ether such as dioxane, tetrahydrofuran and diethyl ether, a ketone such as acetone and methyl ethyl ketone and a hydrocarbon such as pentane and hexane. Although there is no specific limitation on the cleaning temperature, it is preferably, for example, from 0 to 80° C. Moreover, although there is no specific limitation on the cleaning time, it is preferably, for example, from 10 sec to 1 hour per one time.

The raw material polyketone thus obtained is dissolved in an aqueous solution of at least one metal salt selected from a zinc salt, a calcium salt and a thiocyanic acid salt to give a polyketone solution. Specific examples of the zinc salt include zinc chloride, zinc bromide and zinc iodide. Specific examples of the calcium salt include calcium bromide, calcium iodide and calcium chloride. Specific examples of the thiocyanic acid salt include sodium thiocyanate, calcium thiocyanate, potassium thiocyanate and lithium thiocyanate. Of these metal salts, a zinc salt such as zinc chloride, zinc bromide and zinc iodide and calcium bromide are preferred in view of the solubility of the polyketone, the cost of the solvent and the stability of the aqueous solution, and zinc chloride is particularly preferred.

Furthermore, it is preferred that the aqueous metal salt solution contains zinc salt and at least one metal salt other than a zinc salt. When the aqueous metal salt solution contains zinc salt alone such as zinc chloride or a metal salt alone other than a zinc salt such as calcium bromide or calcium thiocyanate, the solution can dissolve a polyketone, and spinning can be conducted. However, because the resultant polyketone solution shows spinnability to a lower degree, it is difficult to conduct stabilized spinning at high speed over a long period. On the other hand, when the aqueous metal salt solution contains a zinc salt and a metal salt other than a zinc salt, the resultant polyketone solution shows spinnability to a high degree. As a result, stabilized spinning can be conducted at high speed, and polyketone fibers showing a high tensile strength and a high tensile elastic modulus can be stably obtained.

Examples of the metal salt other than a zinc salt include a salt of an alkali metal such as lithium, sodium and potassium, a salt of an alkaline earth metal such as magnesium and calcium, and a salt of a transition element such as iron, cobalt, nickel and copper. Specific examples of the metal salt include lithium chloride, lithium bromide, lithium iodide, lithium thiocyanate, sodium chloride, sodium bromide, magnesium chloride, calcium chloride, calcium bromide, calcium thiocyanate, iron chloride and iron bromide.

The following are preferred combinations of a zinc salt and a metal salt other than a zinc salt in view of a stability and a cost of the metal salt, and a tensile strength of the resultant fiber: as a binary component system, zinc chloride and sodium chloride, zinc chloride and calcium chloride, zinc chloride and calcium thiocyanate, zinc chloride and lithium chloride, and zinc chloride and lithium thiocyanate; as a ternary system, zinc chloride, calcium chloride and lithium chloride, zinc chloride, calcium chloride and calcium thiocyanate, and zinc chloride, calcium chloride and lithium thiocyanate.

The metal salt concentration of the aqueous metal salt solution is preferably from 15 to 80% by weight, more preferably from 30 to 77% by weight and still more preferably from 40 to 75% by weight. When the metal salt concentration is too low, a fibrous material pulled up from the coagulation bath in the spinning step is brittle and is likely to be broken. Moreover, when the metal salt concentration is too high, the coagulation rate in the coagulation bath becomes slow, and the spinnable rate is likely to become slow. In addition, the metal salt concentration in an aqueous metal salt solution herein designates a ratio of a weight of the metal salt to the total weight of the metal salt and the water, and is a value defined by the following formula:

metal salt concentration (wt. %)=[weight of metal salt/(weight of metal salt+weight of water)]×100

In the present invention, the polymer concentration in the polyketone solution is preferably from 0.1 to 40% by weight. When the polymer concentration is in the above range, the polymer is easily dissolved in the solvent, and a fibrous material is easily formed in the spinning step; fibers can be produced at a low production cost. In view of an ease of dissolution and spinning and the production cost of the fibers, the polymer concentration is more preferably from 1 to 30% by weight and still more preferably from 3 to 20% by weight. In addition, the polymer concentration herein is a value defined by the following formula:

polymer concentration (% by weight)=[weight of polymer/(weight of polymer+weight of solvent)]×100

A conventional method can be employed as a dissolution method of the polyketone. For example, a homogenous polyketone solution can be obtained by placing a polyketone and a solvent in a dissolver, and stirring the mixture. A known dissolver having a single- or double-shaft stirring blade and excellent in stirring efficiency can be used as the dissolver. A dissolver having a spiral or double-spiral blade is suitable as a dissolver of single-shaft stirring. Examples of a batch type dissolver with double shaft stirring include a planetary mixer having, as a stirring blade, a hook that is rotated and revolved, a double arm kneader and a Banbury mixer. Examples of a continuous dissolver include a screw extruder and a co-kneader.

The polyketone solution obtained by any of the above methods preferably has a phase separation temperature of 0 to 250° C., more preferably 10 to 150° C. and still more preferably 10 to 80° C., because polyketone fibers showing a high tensile strength and a high tensile elastic modulus are easily obtained. When the phase separation temperature is in the above range, the polyketone solution can be stably injected through a spinneret over a long period, and the spinning speed can be increased because the coagulation rate is high.

The phase separation temperature is a temperature at which a solution containing a substantially homogenously dissolved polyketone becomes insoluble in the solvent and the solution begins to reach an inhomogeneous state when the solution is gradually cooled. The inhomogeneous state can be judged from a transmittance of light. When the solution becomes inhomogeneous, the solution becomes turbid and opaque because scattering of light increases.

In the present invention, a substantially homogeneously dissolved polyketone solution (the transmittance of light in the solution is then defined as an initial transmittance of light) is gradually cooled at a rate of 10° C./hour (the transmittance of light is defined as a transmittance of light), and the temperature at which a reduction in the transmittance of light reaches 10% is defines as a phase separation temperature. In addition, the measurement method of a light transmittance is as described later. Moreover, the reduction in a light transmittance is a value defined by the following formula:

reduction in a light transmittance (%)=[(initial transmittance−transmittance)/initial transmittance]×100

Furthermore, another method of measuring a phase separation temperature is explained below. A solution of a substantially uniformly dissolved polyketone is placed in a glass cell. The solution is gradually cooled at a rate of 10° C./hour, and letters placed on one side of the cell are observed on the opposite side through the glass cell; the temperature at which the letters begin to be obscured may also be defined as a phase separation temperature. The results are substantially the same as those obtained by the above method.

The phase separation temperature varies depending on a metal salt composition of the solvent, a polymer concentration and a polymer molecular weight. A polyketone solution having a phase separation temperature in a range of 0 to 250° C. can be obtained by adjusting types of metal salts, a composition of metal salts, a concentration of metal salts, a polyketone concentration and [η] of the polyketone.

One preferred example of the composition of a polyketone solution is as follows: the metal salts are calcium chloride and zinc chloride with a weight ratio of calcium chloride/zinc chloride being from 68.0/32.0 to 61.0/39.0; the aqueous metal salt solution contains 60.0 to 63.0% by weight of metal salts; [η] of the polyketone is from 5 to 10 dl/g; and the polymer concentration is from 5 to 10% by weight. Another example thereof is as follows: the metal salts are zinc chloride, calcium chloride and lithium chloride with a weight ratio of (calcium chloride+lithium chloride)/zinc chloride being from 68.0/32.0 to 61.0/39.0, and with a weight ratio of calcium chloride/lithium chloride of 90/10 to 65/35; the aqueous metal salt solution contains 59.0 to 64.0% by weight of metal salts; [η] of the polyketone is from 5 to 10 dl/g; and the polymer concentration is from 5 to 10% by weight.

Such a polyketone solution as mentioned above is quantitatively fed from a dissolver by a gear pump, etc., via tubing, is optionally filtered, and is injected through a spinneret.

In the present invention, the polyketone in the polyketone solution injected through a spinneret shows a minimum value of a UV absorbance (hereinafter referred to as $A_{min}(S)$) of 0.5 or less in a wavelength region of 210 to 240 nm. The polyketone solution immediately after being injected through a spinneret is preferably sampled in order to enhance the accuracy. In order to measure a UV spectrum of the polyketone solution thus sampled, the amount of the metal salts originating from the solvent and remaining in the polyketone is preferably small. The remaining amount is preferably 1% by weight or less based on the polyketone, and more preferably 0.1% by weight or less. The remaining amount can be determined by metal analysis such as high-frequency plasma emission spectral analysis.

In order to determine the UV spectrum of a polyketone, the polyketone is sampled from the polyketone solution by, for example, the following procedure.

A polyketone solution immediately after being injected through a spinneret is sampled. The sampled polyketone solution is then poured into water or an aqueous solution containing hydrochloric acid, sulfuric acid, phosphoric acid, or the like, and having a pH of 1 to 4, to precipitate the polyketone. The precipitated polyketone is further washed with water. The polyketone may optionally be washed with an aqueous solution containing hydrochloric acid, sulfuric acid, phosphoric acid, or the like, and having a pH of 1 to 4. The polyketone is then dried until the moisture content falls in a range of 1% by weight or less. The polyketone thus obtained is subjected to UV absorption spectrum measurements by the same procedure as in the measurement of $A_{min}(F)$ of fibers to be described later.

An increase in $A_{min}(S)$ signifies that a polymer modification such as an intermolecular or intramolecular crosslinking reaction caused by aldol condensation, or the like, has taken place during a period from dissolution of the polyketone in the solvent to injection of the solution through a spinneret. When $A_{min}(S)$ exceeds 0.5, polymer modification products cause the problem that single filament breakage increases in the hot drawing step after producing the yarn, and the problem that the tensile strength and tensile elastic modulus are significantly lowered when the yarn is hot drawn at a high strain rate. Moreover, when $A_{min}(S)$ exceeds 0.5, $A_{min}(F)$ also exceeds 0.5. In order to decrease $A_{min}(F)$, suppress single filament breakage, suppress lowering of a tensile strength and a tensile elastic modulus when the yarn is drawn at a high strain rate and obtain a higher tensile strength and a higher elastic modulus, $A_{min}(S)$ is preferably 0.4 or less, and more preferably 0.3 or less.

$A_{min}(S)$ is varied in accordance with a combination of a temperature and a period during dissolution and injection through a spinneret of the polyketone. $A_{min}(S)$ can therefore be made to fall in a range of 0.5 or less by repeating a measurement of $A_{min}(S)$ while a combination of the temperature and period is being changed, and determining an appropriate combination of the temperature and period.

A preferred specific example of the production process in the present invention is explained below.

In a process for producing polyketone fibers by injecting through a spinneret a polyketone solution prepared by dissolving a polyketone in an aqueous solution that contains at least one metal salt selected from the group consisting of a zinc salt, a calcium salt and a thiocyanate salt, the present invention provides a process for producing polyketone fibers, wherein when a period (assumed to be P minutes) from dissolving the polyketone in the aqueous metal salt solution to injecting the polyketone solution through a spinneret is divided into minutes and the arithmetic mean of a heating temperature at t–1 minutes from dissolution of the polyketone and a heating temperature at t minutes therefrom is represented by $T_t(K)$, the above formula (2) is satisfied.

A period from dissolving a polyketone in the aqueous metal salt solution to injecting the polyketone through a spinneret starts from contacting the polyketone with the aqueous metal salt solution that is a solvent of the polyketone in the dissolution step, and ends by injecting the polyketone solution through the spinneret via steps such as dissolution, defoaming, filtering and transfer in a tubing. As a result of investigating in detail the relationship between a change in $A_{min}(S)$ mentioned above and a temperature and a period when the polyketone is contacted with the aqueous metal salt solution and heated, the present inventors have found that an Arrehnius-type relation formula observed in chemical reactions holds between a rate of increasing $A_{min}(S)$ and a temperature. Moreover, they have found the above formula (2) from the experimental results of a combination of a temperature and a period at which $A_{min}(S)$ becomes 0.5.

The total period of the step from contacting a polyketone with the aqueous metal salt solution (0 minute) to injecting the resultant solution through a spinneret is divided into minutes with a fraction of one minute being eliminated, and the resultant period from contacting the polyketone with the aqueous metal salt solution to injecting the polyketone solution through a spinneret is assumed to be P minutes. Accordingly, t is a natural number from 1 to P; the solution temperature $T_t$ in a period between (t–1) minutes and t minutes is defined as a value obtained by dividing the sum of a solution temperature at (t–1) minutes and a solution temperature at t minutes by 2, that is, $T_t$ is defined as the arithmetic mean.

A specific example of the calculation method of S is described in Example 1. When S is larger, $A_{min}(S)$ mentioned above increases more, and the polyketone in the polyketone solution causes an intermolecular or intramolecular chemical crosslinking reaction to form more polyketone modified products. As a result, the presence of the polyketone modified products hinders hot drawing in the hot drawing step, and causes deterioration of the tensile strength, tensile elastic modulus, heat resistance and fatigue resistance of the polyketone fibers after drawing.

When S is greater than 1.0, $A_{min}(S)$ becomes greater than 0.5, and the presence of modified products of the polyketone hinders hot drawing in the hot drawing step to be described later, and causes single filament breakage, and lowering of the tensile strength, tensile elastic modulus, heat resistance and fatigue resistance of the polyketone fibers. In order to decrease a value of $A_{min}(S)$ more, and to solve the above problems, S is preferably 0.6 or less, and more preferably 0.3 or less.

Furthermore, the polyketone used in the production process of the invention has a palladium content of preferably 50 ppm or less based on the polymer weight. As explained above, the palladium content of the raw material polyketone causes acceleration of the polyketone modification in the polyketone solution. As a result, $A_{min}(S)$ is likely to increase, and the polyketone fibers thus obtained tend to show a low tensile strength and a low tensile elastic modulus when the palladium content is greater than 50 ppm. The palladium content is more preferably 30 ppm or less and particularly preferably 10 ppm or less.

When an aqueous zinc salt solution is used to dissolve a polyketone in the present invention, the concentration of the zinc salt is preferably 60% by weight or less, more preferably 40% by weight or less and still more preferably 30% by weight or less. Because the zinc salt causes acceleration of a polyketone modification in the polyketone solution, $A_{min}(S)$ is likely to increase, and the polyketone fibers thus obtained tend to show a low tensile strength and a low tensile elastic modulus when the zinc salt concentration is greater than 60% by weight. Moreover, when the zinc salt concentration is too low, dissolution of the polymer takes much time. The zinc salt concentration is therefore preferably 10% by weight or more and more preferably 15% by weight or more. In addition, the zinc salt concentration herein designates a ratio of a weight of the zinc salt to the total weight of the metal salt and water in the aqueous metal salt solution, and is a value defined by the following formula:

concentration of zinc salt (wt. %)=[weight of zinc salt/(weight of metal salts+water)]×100

The polyketone can be dissolved by placing the polyketone and a solvent in the dissolver mentioned above and stirring the contents. A homogeneous polyketone solution can then be obtained. There is no specific limitation on the dissolution temperature. When the dissolution temperature is high, an apparatus such as a kneader that shows a high shear force and that can efficiently stir is used, and the polyketone should be dissolved in a short period. However, when the apparatus is continuously operated over a long period, a polyketone solution remaining in a dead space sometimes causes troubles such as a variation in fiber physical properties and yarn breakage.

Therefore, a low dissolution temperature is preferred. The dissolution temperature is preferably 100° C. or less, more preferably 80° C. or less and still more preferably 60° C. or less. A dissolution temperature of lower than −20° C. increases the cooling cost and extends a dissolution period, leading to an increase in the installation cost. The dissolution temperature is therefore preferably −20° C. or more, more preferably 0° C. or more and still more preferably 10° C. or more. Moreover, a long dissolution period has the following disadvantages: a large dissolution installation is required and, as a result, an accurate temperature is hardly possible; the installation cost and the operation cost increase. Accordingly, the dissolution period is preferably 10 hours or less, more preferably 8 hours or less and still more preferably 6 hours or less.

The polyketone solution can be defoamed by allowing the solution to stand under reduced pressure or at atmospheric pressure. When the polyketone solution has a high viscosity, the treatment requires a long period. A substantially homogeneous polyketone solution containing no air bubbles can then be obtained by pouring a polyketone and a defoamed solvent into a dissolver under reduced pressure of preferably 13.3 kPa or less, more preferably 1.33 kPa or less and still more preferably 0.133 kPa or less, and stirring the contents while the inclusion of air is being suppressed. When the above procedure is employed, S can be decreased further.

The polyketone solution is subsequently fed to a spinneret with a gear pump, or the like, through tubing. In view of decreasing S, it is preferred to optionally make the heating temperature of the polyketone solution during filtering and in a tubing as low as possible. In view of the installation and energy cost, it is preferred to make the heating temperature the same as the dissolution temperature. The heating temperature is suitably adjusted while the pressure applied to the polyketone solution during transfer thereof in a filtering apparatus or a tubing or the phase separation temperature thereof (if the solution has a phase separation temperature) is being taken into consideration. Moreover, a shorter residence time of the polyketone solution in the step is preferred. For example, when the heating temperature is from 10 to 60° C., the residence time is preferably 3 hours or less, more preferably 2 hours or less and still more preferably 1 hour or less.

The temperature of the polyketone solution injected through a spinneret is preferably from 60 to 100° C., more preferably from 70 to 90° C. and still more preferably from 75 to 80° C. When the polyketone solution temperature is in the above range, polyketone fibers showing a high tensile strength are obtained after drawing a spun yarn.

Furthermore, when the polyketone solution is further heated from the temperature at which the solution is filtered, and fed with a gear pump, etc., through tubing, a shorter heating period is preferred. For example, when the polyketone solution is heated from 50 to 60° C. to 75 to 80° C., the heating period is preferably 1 hour or less and more preferably 30 minutes or less.

As explained above, the polyketone solution injected through a spinneret is solidified in a fibrous state in a coagulation bath by a conventional procedure, and the fibrous material is optionally cleaned and dried, and hot drawn to give polyketone fibers.

Water, an aqueous metal salt solution, or the like, is used as the coagulation bath. In order to enhance the tensile strength of the polyketone fibers subsequent to drawing, the coagulation bath temperature is preferably 30° C. or less. When the polyketone solution has a phase separation temperature, the coagulation bath temperature is preferably equal to or lower than the phase separation temperature and more preferably lower than the phase separation temperature by 30° C. or more. However, when the coagulation bath temperature is lower than −50° C., the coagulation rate is decreased, and the spinning speed cannot be increased. Moreover, the cooling cost increases. The coagulation bath temperature is therefore preferably −50° C. or more.

Because metal salts originating from the solvent and remaining in polyketone fibers prior to hot drawing hinders hot drawing sometimes, the total remaining amount of metals salts in terms of the metal elements is preferably 500 ppm or less based on the weight of the polymer, more preferably 200 ppm or less and still more preferably 100 ppm or less. When the amount of metal salts remaining in the fibers is 500 ppm or less, fluffs are hardly formed during hot drawing, and polyketone fibers showing a high tensile strength are obtained.

In order to remove metal salts originating from the solvent and remaining in the polyketone fibers prior to hot drawing, the polyketone fibers are preferably cleaned with a cleaning solvent. There is no specific limitation on the cleaning solvent as long as the solvent can clean the fibers to remove metal salts therefrom. For example, it is preferred to clean the fibers with a combination of an aqueous solution containing an acid such as sulfuric acid and phosphoric acid and having a pH of 4 or less and water in comparison with cleaning the fibers with water alone, because the former combination can better decrease metal salts remaining in the fibers. Examples of the cleaning method include a method of passing the yarn through a bath containing a cleaning solvent, and a method of spraying a cleaning solvent from above and/or below the yarn. These methods may, naturally, be used in combination.

The resultant polyketone fibers are preferably dried prior to hot drawing so that the moisture is removed because polyketone fibers showing a high tensile strength and a high tensile elastic modulus can be easily obtained. A known apparatus such as a tunnel type drying machine, a roll heating machine and a net process type drying machine can be used as the drying apparatus. The drying temperature is preferably from 150 to 250° C. because polyketone fibers showing a high tensile strength are obtained.

Polyketone fibers showing a high tensile strength and a high tensile elastic modulus are obtained by hot drawing the fibers thus obtained.

The hot drawing temperature is preferably from 100 to 300° C. Hot drawing may be conducted by either one-stage drawing or multistage drawing in which the drawing temperature is gradually increased. However, multistage drawing is preferred because a high total draw ratio and a high drawing speed can be obtained. In view of easily obtaining a high tensile strength and a high tensile elastic modulus of the fibers, the total draw ratio is preferably 7 or more, more preferably 12 or more and still more preferably 15 or more.

A high strain rate is preferred for the following reasons: the drawing speed can be increased with a short heating length; the installation cost can be decreased; and the production rate can be increased. The strain rate (denoting a minimum strain rate in the case of multistage drawing) is preferably 0.06 sec$^{-1}$ or more, and more preferably 0.10 sec$^{-1}$ or more. When the draw ratio is higher, the strain rate is hardly increased more. When the strain rate is too large, the tensile strength and tensile elastic modulus of the polyketone fibers thus obtained tend to be lowered. The strain rate is therefore preferably 1.00 sec$^{-1}$ or less, and still more preferably 0.50 sec$^{-1}$ or less. In addition, the strain rate is a value defined by the following formula:

$$\text{strain rate (sec}^{-1}) = (V_2 - V_1)/L$$

wherein $V_1$ is a feed speed (m/sec) of drawing, $V_2$ is a take-up speed (m/sec) of drawing, and L is a heating length (m).

A yarn can be drawn by, for example, adjusting the speed of a feed roll and that of a take-up roll, and heating the yarn between the two rolls. A length of the yarn heated between the two rolls the speeds of which are being adjusted, respectively, is termed a heating length. The number of combination of such drawing is termed a number of stages of hot drawing. Any of the known methods of heating a yarn such as a method comprising traveling a yarn on a hot roll or a hot plate, a method comprising traveling a yarn in a gas heated with a heating furnace, and a method comprising traveling a yarn while being irradiated with a laser beam, microwaves or an IR-ray can be used with or without a further improvement.

In the process for producing the polyketone fibers of the present invention, drawing at a strain rate (denoting a minimum strain rate in the case of multistage drawing) of 0.06 sec$^{-1}$ or more is defined as "drawing at a high strain rate", and drawing at a strain rate of less than 0.06 sec$^{-1}$ is defined as "drawing at a low strain rate."

The polyketone fibers obtained as explained above are subjected to the following texturing without further processing: twisting; false twisting; bulky texturing; crimping; winding texturing; and the like. Alternatively, the polyketone fibers may also be optionally subjected to short fiber treatment to give a spun yarn, which is then subjected to the above texturing. The textured yarn may be further used to form a woven fabric, a knitted fabric or nonwoven fabric, and such fiber products can be used. In particular, when a twisted yarn is prepared from the polyketone fibers of the present invention, fluffs are hardly formed during texturing, and the fibers exhibit an excellent effect of the capability of stabilized production of the twisted yarn. There is no specific restriction on the type of the twisted yarn, method of twisting and the number of doubled and twisted yarns.

Examples of the twisted yarn include a single twist yarn, a plied yarn, a plied yarn of different nature of strand and a hard twist yarn. There is no specific limitation on the number of doubled and twisted yarns. Any of the one twisted yarn, two twisted yarns, three twisted yarns, four twisted yarns and five twisted yarns may be used. At least six doubled twisted yarns may also be used. Polyketone fibers and such fibers other than polyketone fibers as nylon fibers, polyester fibers, aramid fibers and rayon fibers may then be doubled and twisted.

There is no specific limitation on the number of twisted yarns, and the number can be suitably selected according to a single filament size and a total size, or texturing conditions and applications. For example, for a twisted yarn cord formed out of polyketone fibers having a single filament size of 0.01 to 10 dtex and a total size of 30 to 100,000 dtex, a twisted yarn having a twist factor K represented by the formula shown below of 1,000 to 30,000 is preferred in view of the tensile strength and fatigue resistance of the yarn.

$$K(T/m \cdot dtex^{0.5}) = Y \times D^{0.5}$$

wherein Y is the number of twisting (T/m) per m of the twisted yarn cord, and D is a total size (dtex) of the yarn prior to twisting.

For example, when two yarns of the polyketone fibers each having a size of 1,660 dtex are twisted, D becomes about 3,320 dtex. When a plurality of yarns of the polyketone fibers are twisted, and subjected to multi-twisting such as first twisting and second twisting, the number of twisting finally applied is defined as Y, and K is calculated.

Such a twisted yarn cord of the polyketone fibers can be treated with a 10-30 wt. % resorcin-formalin-latex (hereinafter abbreviated to RFL) solution, and dried and heat treated at 100° C. or more so that an RFL resin sticks to the twisted yarn cord, to give an RFL-treated cord of the polyketone fibers.

An amount of the RFL resin sticking to the twisted yarn cord is preferably from 2 to 7% by weight based on the yarn. There is no specific limitation on the composition of the RFL solution, and a conventionally known composition may be used without further processing or after improvement. A preferred composition of the RFL solution is as follows: from 0.1 to 10% by weight of resorcin, from 0.1 to 10% by weight of formalin, and from 1 to 28% by weight of latex; more preferably from 0.5 to 3% by weight of resorcin, from 0.5 to 3% by weight of formalin and from 10 to 25% by weight of latex. The twisted yarn cord treated with an RFL solution is dried at temperature preferably from 120 to 250° C. and more preferably from 130 to 200° C. The drying period is 10 sec or more and preferably from 20 to 120 sec.

Furthermore, the RFL resin-coated cord after drying is then desirably heat treated for a given period while the cord is being held at a constant length. Conditions of such heat treatment are explained below. The heat treatment temperature is preferably a maximum heat shrinkage temperature of the twisted yarn cord of the polyketone fibers ±50° C., more preferably a maximum heat shrinkage temperature ±10° C. and most preferably a maximum heat shrinkage temperature ±5° C. The treating period is preferably from 10 to 300 sec and more preferably from 30 to 120 sec. Moreover, the cord is preferably held at a constant length during heat treatment. Specifically, the dimensional change of the cord caused by the heat treatment is preferably 3% or less, more preferably 1% or less and still more preferably 0%.

Figure 1:
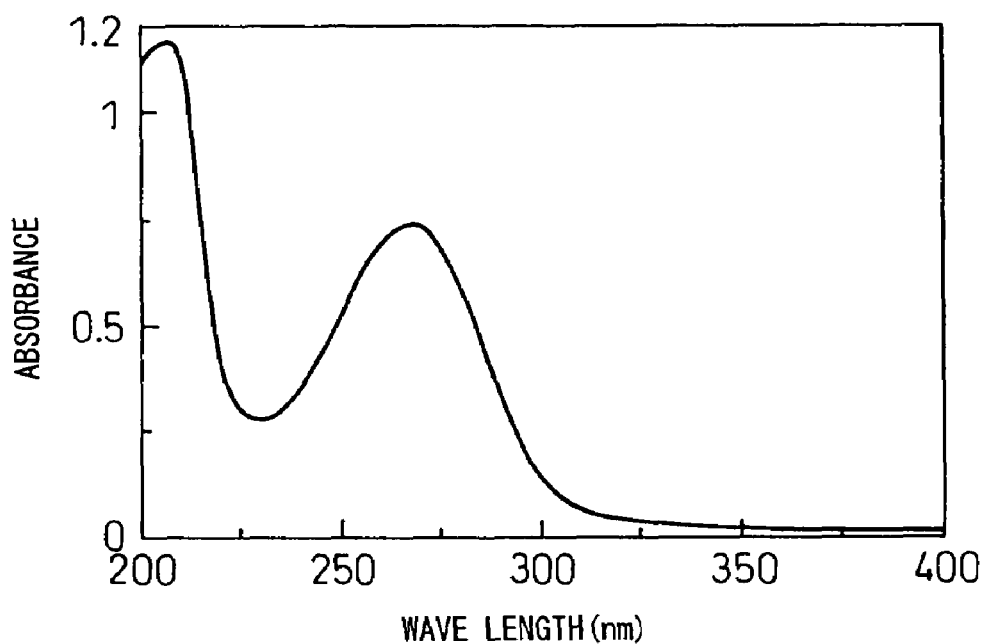
FIG. 1 shows a UV absorption spectrum of polyketone fibers obtained by four-stage drawing at a low strain rate in Example 1.

1: rubber tube for testing
2: grip portion
3: rotary portion
4: supply tube of compressed air
5: driving pulley
6: revolution indicator
θ: bending angle of a rubber tube for testing

BEST MODE FOR CARRYING OUT THE INVENTION

The present invention is further explained below by making reference to examples. However, the present invention is in no way restricted thereto.

In addition, the measurement methods, evaluation methods, and the like, are as explained below.

(1) Intrinsic Viscosity

The intrinsic viscosity [η] is determined according to the following definition formula:

$$[\eta] = \lim_{C \to 0} (T-t)/(t \cdot C)$$

wherein t is a period of time required for hexafluoroisopropanol (manufactured by CENTRAL GLASS Co., Ltd.) to flow through a viscosity tube at 25° C., T is also a period of time required for a diluted solution of a polyketone in the same solvent to flow therethrough, and C is a concentration of the polyketone in the diluted solution in terms of weight (g) of the polyketone per 100 ml of the solvent.

(2) $A_{min}(F)$

Polyketone fibers in an amount of 100 mg are dissolved in 100 g of hexafluoroisopropanol (manufactured by CENTRAL GLASS Co., Ltd.) at 25° C. for 3 hours. The resultant solution is placed in a quartz glass cell, and the UV absorption spectrum is measured with a spectrophotometer for ultraviolet and visible region V-530 (trade name, manufactured by JASCO Corporation). The minimum value of a UV absorbance observed in a wavelength region of 210 to 240 nm is represented by $A_{min}(F)$.

(Measurement Conditions)
Scanning speed: 200 nm/min
Interval of taking data: 0.5 nm
Band width: 2.0 nm
Response: Quick
Measurement range: 200 to 600 nm
Base line: Corrected (3) Tensile Strength, Tensile Elongation and Tensile Elastic Modulus of Fibers Measurements are made in accordance with JIS L 1013

Measurements are made 20 times with a sample length of 20 cm at a tensile speed of 20 cm/min, and the average is determined.

(4) $A_{min}(S)$

A polyketone solution in an amount of 10 g is collected immediately after injecting the solution through a spinneret. The collected solution is placed in 500 ml of an aqueous 0.1 wt. % hydrochloric acid solution at 30° C., and coagulated while being crushed so that the crushed pieces have a length of 5 mm or less. The crushed pieces are washed with flowing water for 10 hours, and dried at 105° C. for 5 hours so that the moisture is removed to give a polyketone powder. The UV spectrum of the powder is measured in the same manner as in (2) explained above, and the minimum value of the UV absorbance observed in the wavelength region of 210 to 240 nm is represented by $A_{min}(S)$.

(5) Amount of Pd, Zn, Ca or Li

A high-frequency plasma emission spectral analysis is used.

(6) Phase Separation Temperature

A dissolved polyketone solution (the light transmittance of which is defined as an initial transmittance) is gradually cooled at a rate of 10° C./hr (the light transmittance in the solution is defined as a transmittance). When the reduction of a light transmittance reaches 10%, the solution temperature is defined as a phase separation temperature.

In addition, the measurement temperature range is from 0° C. to a dissolution temperature. When the phase separation temperature is less than 0° C., it is defined that the solution has no phase separation temperature. Moreover, the reduction of light transmittance is a value defined by the following formula:

reduction in light transmittance (%)=[(initial transmittance−transmittance)/initial transmittance]×100

Measurements of a light transmittance are made with a laser type light scattering photometer LSD 101 (trade name, manufactured by Nihon Kagaku Engineering K.K.) having a sample cell unit that can be controllably heated and cooled. The light source is a He-Ne laser with a wavelength of 632.8 nm. The output is 15 mW, and the beam diameter is 1.50 mm (at $1/e^2$).

(7) Variation in Tensile Strength

The variation in a tensile strength is calculated from the following formula in which an average, a maximum value and a minimum value of tensile strength obtained in (3) mentioned above are used:

variation in tensile strength=(maximum value of tensile strength−minimum value of tensile strength)/ (average of tensile strength)

(8) Heat Resistance

Polyketone fibers are wound around a metal frame 50 cm long, placed in an electric drying machine (trade name of Fine Oven DH 62, manufactured by Yamato Scientific Co., Ltd.), and heat treated in an air atmosphere at 150° C. for 3 days. The tensile strength of the resultant fibers is measured, and the heat resistance of the fibers is evaluated from a retention (%) of the tensile strength prior to heat treatment.

(9) Measurements of Fluffs

The number of fluffs per 10,000 m of wound polyketone fibers formed by single filament breakages is counted while the fibers are being unwound at a yarn speed of 50 m/min.

(10) Evaluation of Twisted Yarns

Five yarns of the polyketone fibers thus obtained are doubled, and first twisted (Z direction) and second twisted (S direction) with a twisting machine (manufactured by Kaji Tekko K.K.). The number of fluffs per 100 m is then counted. In addition, for the first and second twists, the yarn was twisted at a feed speed of 12 m/m and a twist number of 390/m both in first and second twist.

(11) Fatigue Resistance

Polyketone fibers are twisted by the above procedure, and treated with a resorcin-formalin-latex solution (22 parts by weight of resorcin, 30 parts by weight of an aqueous 30 wt. % formalin solution, 14 parts by weight of an aqueous 10 wt. % NaOH solution, 570 parts by weight of water and 41 parts by weight of vinylpyridine latex) to give an RFL-treated cord.

Figure 3:
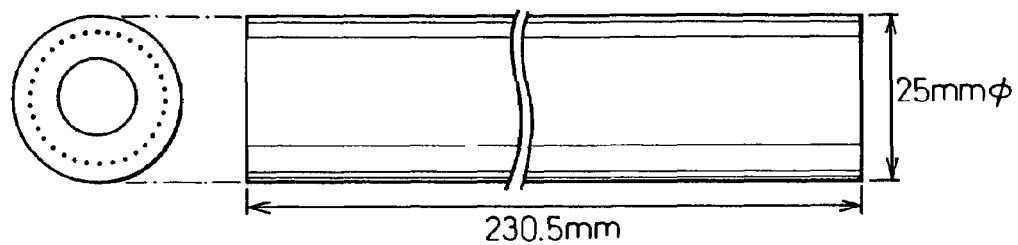
FIG. 3 is schematic views of a rubber tube for testing in evaluating a fatigue resistance. A cross-sectional view is shown on the left-hand side, and a side view is shown on the right-hand side.

A rubber tube (an outside diameter of 25 mm, an inside diameter of 13 mm and a length of 230.5 mm) shown in FIG. 3 is prepared from a non-vulcanized rubber composed of the RFL-treated cords thus obtained, 70% by weight of natural rubber, 15% by weight of SBR and 15% by weight of carbon black. Seventy RFL-treated cords are embedded in the rubber tube at a site 20 mm in diameter. The rubber tube is vulcanized (vulcanization conditions: 140° C.; 60 kg/cm²; 40 minutes) to give a rubber tube for testing.

Figure 4:
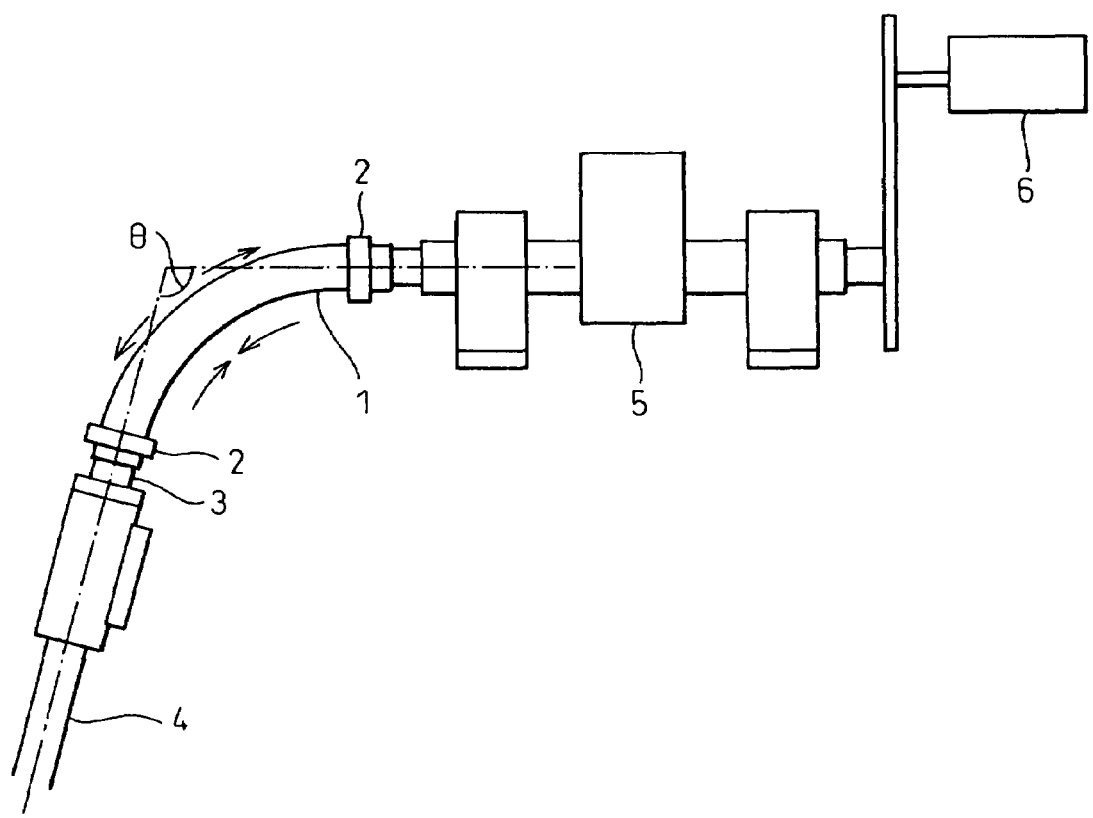
FIG. 4 is a schematic view of a testing apparatus used for evaluating a fatigue resistance. In addition, the reference numerals in FIG. 4 designate as follows.

The rubber tube is set in a testing apparatus shown in FIG. 4, and subjected to a stretch-compression fatigue test in accordance with JIS L 1017 2.2.1 (i.e., Goodyear method). In addition, the test conditions are as follows: an inner pressure of the tube of 3.3 kg/cm²; an angle (θ in FIG. 4) of 130 degrees; a number of rotations of 850 (rotary direction being varied every 30 minutes); and a treatment period of 24 hours. The cords are taken out from the tube after finishing the test, and the tensile strength retention (%) in comparison with the tensile strength of the cords prior to the test is determined to evaluate the fatigue strength.

REFERENCE EXAMPLE 1

Synthesis of Polyketone

A solution prepared in advance by stirring 1.8 mmoles of palladium acetate, 2.2 mmoles of 1,3-bis(di(2-methoxyphenyl)-phosphino)propane and 36 mmoles of trifluoroacetic acid in 1 liter of acetone was used as a catalyst solution.

A 55-liter autoclave was first charged with 27 liters of methanol, and then with the above catalyst solution. The autoclave was then filled with a gas mixture of carbon monoxide and ethylene in a molecular ratio of 1:1, and the gas mixture was reacted at 79° C. for 6 hours while a gas mixture of the same composition was being continuously added so that a gas pressure of 5 MPa was maintained.

The gas pressure was released after the reaction. The white polymer thus obtained was repeatedly cleaned with warm methanol and 1,3-pentadione, and isolated. The yield of the polymer was 5.9 kg.

It was found by analyses, such as NMR spectrum analysis and IR absorption spectrum analysis, that the polyketone thus obtained was a polyketone containing substantially 100% by mole of a repeating unit of the above formula (1) based on the total repeating units. Moreover, the polyketone had an intrinsic viscosity of 5.5 dl/g and contained 25 ppm of palladium.

REFERENCE EXAMPLE 2

Synthesis of Polyketone

A solution prepared in advance by stirring 2.0 mmoles of palladium acetate, 2.4 mmoles of 1,3-bis(di(2-methoxyphenyl)-phosphino)propane and 40 mmoles of trifluoroacetic acid in 1 liter of acetone was used as a catalyst solution.

A 55-liter autoclave was charged with 27 liters of methanol at first, and then with the above catalyst solution. The autoclave was then filled with a gas mixture of carbon monoxide and ethylene in a molecular ratio of 1:1, and the gas mixture was reacted at 55° C. for 15 hours while a gas mixture of the same composition was being continuously added so that a gas pressure of 5 MPa was maintained.

The gas pressure was released after the reaction. The white polymer thus obtained was repeatedly cleaned with cold methanol, and isolated. The yield of the polymer was 3.9 kg.

It was found by analyses, such as NMR spectrum analysis and IR absorption spectrum analysis, that the polyketone thus obtained was a polyketone containing substantially 100% by mole of a repeating unit of the above formula (1) based on the total repeating units. Moreover, the polyketone had an intrinsic viscosity of 5.0 dl/g and contained 52 ppm of palladium.

EXAMPLE 1

An aqueous solution in which the mass ratio of zinc chloride/lithium chloride/calcium chloride/water was 22/10/30/38 was heated to 50° C. in a dissolver, and the polyketone obtained in Reference Example 1 was added so that the polymer concentration reached 7.5% by weight. The resultant mixture was stirred for 6 hours while being defoamed by evacuating the pressure to 6.7 kPa to give a homogenous transparent polyketone solution (dissolution step).

Part of the polyketone solution was transferred to a sample cell, and the light transmittance was measured while the solution temperature was being cooled from 85° C. at a rate of 10° C./hour. The phase separation temperature of the polyketone solution was 42° C.

The polyketone solution thus obtained was quantitatively fed to the next step from the dissolver with a gear pump while being held at 50° C. in the dissolver, and filtered at 50° C. with a 20-μm filter (filtering step). The residence time during the step was 30 minutes.

Next, the polyketone solution was proportionately heated from 50 to 80° C. in a tubing (heating step), and injected at 80° C. through a spinneret having 250 nozzles each having a diameter of 0.18 mm at a speed of 13.9 mm/min (injection step). In addition, a heating period from 50 to 80° C. was 30 minutes, and a period from reaching 80° C. to injection through a spinneret was 15 minutes.

The injected polyketone was then passed through an air gap 10 mm long, passed through a coagulation bath composed of water at 2° C., pulled up with a Nelson roll at a speed of 20 m/min, sprayed with 0.5 wt. % hydrochloric acid on the Nelson roll, washed with water by spraying, and dried at a speed of 20 m/min with a roll drying machine at 220° C.

Next, drawing at a high straining rate was conducted in the following manner.

The dried yarn was hot drawn by four stages without winding so that the total draw ratio became 16.4.

The drawing conditions at the first stage were as follows: the yarn was passed through a heating furnace 5 m long at 240° C., and drawn (draw ratio of 7.0) between two pairs of rolls (first pair of rolls: 20 m/min; second pair of rolls: 140 m/min). The strain rate was 0.40 sec$^{-1}$.

The drawing conditions at the second stage were as follows: the yarn was passed through a heating furnace 5 m long at 255° C., and drawn (draw ratio of 1.5) between two pairs of rolls (first pair of rolls: 140 m/min; second pair of rolls: 210 m/min). The strain rate was 0.23 sec$^{-1}$.

The drawing conditions at the third stage were as follows: the yarn was passed through a heating furnace 10 m long at 265° C., and drawn (draw ratio of 1.3) between two pairs of rolls (first pair of rolls: 210 m/min; second pair of rolls: 273 m/min). The strain rate was 0.11 sec$^{-1}$.

The drawing conditions at the fourth stage were as follows: the yarn was passed through a heating furnace 10 m long at 270° C., and drawn (draw ratio of 1.2) between two pairs of rolls (first pair of rolls: 273 m/min; second pair of rolls: 328 m/min). The strain rate was 0.09 sec$^{-1}$.

Spinning was conducted for one hour, and no yarn breakage was observed. The number of fluffs formed by single filament breakage was as small as 2/10,000 m, and spinning was well conducted. As a result of measuring a UV absorption spectrum of the fibers thus obtained, $A_{min}(F)$ was found to be 0.24. Moreover, the fibers had a size of 305 dtex/250 filaments, and showed a tensile strength of 18.2 cN/dtex, a tensile elongation of 5.2%, a tensile elastic modulus of 433 cN/dtex and a variation in the tensile strength of 0.20. Furthermore, the tensile strength retention in evaluating a heat resistance was as high as 83%.

Because the above evaluation of spinning was performed from 1 to 2 hours after dissolving the polyketone, S was then from 0.35 to 0.38. After finishing the evaluation of spinning (2 hours after dissolution), a polyketone solution injected through the spinneret was sampled. As a result of measuring a UV absorption spectrum of the polyketone, $A_{min}(S)$ was found to be 0.20.

On the other hand, drawing at a low strain rate was conducted in the manner as explained below.

A yarn was prepared under the above conditions until drying. The yarn after drying was once wound, and the first- and the second-stage drawing were conducted, followed by winding the drawn yarn. The third- and the fourth-stage drawing were further conducted at a low strain rate. The total draw ratio was 16.4 that was the same as the numerical value obtained at a high strain rate.

The drawing conditions at the first stage were as follows: the yarn was passed through a heating furnace 5 m long at 240° C., and drawn (draw ratio of 7.0) between two pairs of rolls (first pair of rolls: 10 m/min; second pair of rolls: 70 m/min). The strain rate was 0.20 sec$^{-1}$.

The drawing conditions at the second stage were as follows: the yarn was passed through a heating furnace 5 m long at 255° C., and drawn (draw ratio of 1.5) between two pairs of rolls (first pair of rolls: 70 m/min; second pair of rolls: 105 m/min). The strain rate was 0.12 sec$^{-1}$.

The drawing conditions at the third stage were as follows: the yarn was passed through a heating furnace 10 m long at 265° C., and drawn (draw ratio of 1.3) between two pairs of rolls (first pair of rolls: 40 m/min; second pair of rolls: 52 m/min). The strain rate was 0.02 sec$^{-1}$.

The drawing conditions at the fourth stage were as follows: the yarn was passed through a heating furnace 10 m long at 270° C., and drawn (draw ratio of 1.2) between two pairs of rolls (first pair of rolls: 52 m/min; second pair of rolls: 62.4 m/min). The strain rate was 0.02 sec$^{-1}$.

As a result of measuring a UV absorption spectrum of the fibers thus obtained, $A_{min}(F)$ was found to be 0.27. FIG. 1 shows a UV absorption spectrum of the fibers.

Moreover, the fibers had a size of 299 dtex/250 filaments, and showed a tensile strength of 18.9 cN/dtex, a tensile elongation of 4.9%, a tensile elastic modulus of 471 cN/dtex and a variation in the tensile strength of 0.12. No fluffs were observed. Furthermore, the tensile strength retention in evaluating a heat resistance was 81%.

In comparison with drawing at a low strain rate, even when the polyketone yarn was drawn at a high strain rate, lowering of the tensile strength and tensile elastic modulus was small, and a polyketone yarn showing a high tensile strength and a high tensile elastic modulus was obtained.

When the yarn of polyketone fibers obtained by drawing at a high strain rate was twisted for 3 hours, the number of fluffs formed was 0/100 m. Moreover, when the fatigue resistance of the yarn subsequent to twisting was evaluated, the tensile strength retention was 60%, and a yarn showing a high fatigue resistance was thus obtained.

In addition, S was specifically calculated as explained below.

Because the polyketone was dissolved at 50° C. over 6 hours (360 minutes), $T_1$ to $T_{360}$ were all 323K. S of $T_1$ was: $(1.53 \times 10^8 \times \exp(-8547/323)) = 0.000493$. Because S in the entire step is obtained by multiplying the value by 360, S therein was 0.1775. Moreover, the polyketone solution was quantitatively fed from the dissolver at 50° C. without a temperature change using a gear pump, and a period until the polyketone solution was filtered with a filter was 30 minutes. $T_{361}$ to $T_{390}$ were therefore all 323 K, and S of $T_n$ (n is from 361 to 390) is equal to S of $T_1$. Because S in the entire step is obtained by multiplying the value by 30, S therein was 0.0148.

Thereafter, the polyketone solution in the tubing was proportionately heated from 50 to 80° C. for 30 minutes. Because the polyketone solution temperature 1 minute later was 51° C. in the step, $T_{391}=323.5$K, and S became 0.000513. Similarly, from S of $T_{392}$ to S of $T_{420}$ were each calculated, and S in the entire step was 0.0574.

Because the period from heating the polyketone solution to 80° C. to injecting the solution through a spinneret was 15 minutes, from $T_{421}$ to $T_{435}$ were all 353K, and S of $T_{421}$ was 0.00467. Because S in the entire step was obtained by multiplying the value by 15, S therein was 0.07005.

S in total in the above total steps was 0.32, and Table 1 lists the calculation results.

Because evaluation of spinning was carried out for 1 to 2 hours after dissolving the polyketone, S corresponding to a holding period of from 1 to 2 hours in a dissolver at 50° C. is added (S of $T_1$ being multiplied by from 60 to 120, and the resultant S becoming from 0.02958 to 0.05916), and the total S was therefore from 0.35 to 0.38.

EXAMPLE 2

An aqueous solution in which the mass ratio of zinc chloride/lithium chloride/calcium chloride/water was 22/10/30/38 was heated to 60° C. (higher than that in Example 1 by 10° C.) in a dissolver, and the polyketone obtained in Reference Example 1 was added so that the polymer concentration reached 7.5% by weight. The resultant mixture was stirred for 6 hours, while being defoamed by evacuation to a pressure of 6.7 kPa, to give a homogenous transparent polyketone solution (dissolution step).

Part of the polyketone solution was transferred to a sample cell, and the light transmittance was measured while the solution temperature was being cooled from 85° C. at a rate of 10° C./hour. The phase separation temperature of the polyketone solution was 42° C.

The polyketone solution thus obtained was quantitatively fed to the next step from the dissolver with a gear pump while being held at 60° C. in the dissolver, and filtered at 60° C. with a 20-μm filter (filtering step). The residence time during the step was 30 minutes.

Next, the polyketone solution was proportionately heated from 60 to 80° C. in a tubing (heating step), and injected at 80° C. through a spinneret having 250 nozzles each having a diameter of 0.18 mm (injection step). In addition, a heating period from 60 to 80° C. was 20 minutes, and the period from reaching 80° C. to injection through a spinneret was 15 minutes.

Steps subsequent to the above steps were carried out in the same manner as in Example 1.

During drawing at a high strain rate, no yarn breakage was observed. The number of fluffs formed by single filament breakage was 7/10,000 m. Although the number was slightly large in comparison with that in Example 1, the results were good. As a result of measuring a UV absorption spectrum of the fibers thus obtained, $A_{min}(F)$ was found to be 0.37. Moreover, the fibers had a size of 310 dtex/250 filaments, and showed a tensile strength of 17.3 cN/dtex, a tensile elongation of 5.4%, a tensile elastic modulus of 420 cN/dtex and a variation in the tensile strength of 0.29. Furthermore, the tensile strength retention in evaluating a heat resistance was 79%. Although the tensile strength retention was slightly low in comparison with that in Example 1, it was good. When the amounts of metal elements of zinc, calcium and lithium were measured, the total amount thereof was 60 ppm.

Because the above evaluation of spinning was performed from 1 to 2 hours after dissolving the polyketone, S then became from 0.61 to 0.68. After finishing the evaluation of spinning (2 hours after dissolution), a polyketone solution injected through the spinneret was sampled. As a result of measuring a UV absorption spectrum of the polyketone, $A_{min}$ (S) was found to be 0.36.

As a result of measuring a UV absorption spectrum of the fibers thus obtained during drawing at a low strain rate, $A_{min}(F)$ was found to be 0.37. Moreover, the fibers had a size of 307 dtex/250 filaments, and showed a tensile strength of 18.8 cN/dtex, a tensile elongation of 4.7%, a tensile elastic modulus of 468 cN/dtex and a variation in the tensile strength of 0.22. No fluffs were observed. Furthermore, the tensile strength retention in evaluating a heat resistance was 78%.

In comparison with drawing at a low strain rate, even when drawing was conducted at a high strain rate, lowering of the tensile strength and tensile elastic modulus was small, and polyketone fibers showing a high tensile strength and a high tensile elastic modulus were obtained. However, the tensile strength and tensile elastic modulus were slightly low in comparison with those in Example 1.

When the yarn of polyketone fibers obtained by drawing at a high strain rate was twisted for 3 hours, the number of fluffs formed was 0/100 m. Moreover, when the fatigue resistance of the yarn subsequent to twisting was evaluated, the tensile strength retention was 55%, and a yarn showing a high fatigue resistance was obtained. However, the fatigue resistance was lower than that of the yarn in Example 1.

EXAMPLE 3

An aqueous solution having a mass ratio of zinc chloride/lithium chloride/calcium chloride/water of 22/10/30/38, heated to 50° C. and defoamed, and the polyketone obtained in Reference Example 1 were continuously and quantitatively fed to a 2-axle kneader dissolver so that the polymer concentration reached 7.5% by weight while being evacuated to a pressure of 6.7 kPa to effect dissolution. Although the residence time in the kneader was 30 minutes, a homogenous transparent polyketone solution was obtained (dissolution step).

Part of the polyketone solution was transferred to a sample cell, and the light transmittance was measured while the solution temperature was being reduced from 85° C. at a rate of 10° C./hour. The phase separation temperature of the polyketone solution was 42° C.

The polyketone solution thus obtained was held at 50° C., and quantitatively fed to the next step from the kneader dissolver with a gear pump, and filtered at 50° C. with a 20-μm filter (filtering step). The residence time during the step was 30 minutes.

Next, the polyketone solution was heated from 50 to 80° C. in a tubing (heating step), and injected at 80° C. through a spinneret having 250 nozzles each having a diameter of 0.18 mm at a rate of 13.9 m/min (injection step). In addition, a heating period from 50 to 80° C. was 30 minutes, and a period from reaching 80° C. to injecting through the spinneret was 15 minutes. S was therefore 0.16.

A polyketone solution injected through the spinneret was sampled, and the UV absorption spectrum of the polyketone was measured. As a result, $A_{min}(S)$ was found to be 0.15.

Drawing at a high strain rate was carried out in the same manner as in Example 1. No yarn breakage was observed. The number of fluffs formed by single filament breakage was 0/10,000 m, which is still less than in Example 1. As a result of measuring a UV absorption spectrum of the fibers thus obtained, $A_{min}(F)$ was found to be 0.17. Moreover, the fibers had a size of 309 dtex/250 filaments, and showed a tensile strength of 18.9 cN/dtex, a tensile elongation of 5.6%, a tensile elastic modulus of 466 cN/dtex and a variation in the tensile strength of 0.15. Furthermore, the tensile strength retention in evaluating a heat resistance was 90%. The tensile strength retention was higher than that in Example 1.

Drawing at a low strain rate was carried out in the same manner as in Example 1 except that the drawing was successively conducted after sampling of the above fibers drawn at a high strain rate. As a result of measuring a UV absorption spectrum of the fibers thus obtained, $A_{min}(F)$ was found to be 0.19. Moreover, the fibers had a size of 303 dtex/250 filaments, and showed a tensile strength of 19.3 cN/dtex, a tensile elongation of 4.8%, a tensile elastic modulus of 477 cN/dtex and a variation in the tensile strength of 0.08. No fluffs were observed. Furthermore, the tensile strength retention in evaluating a heat resistance was 87%.

In comparison with drawing at a low strain rate, even when drawing the polyketone was conducted at a high strain rate, lowering of the tensile strength and tensile elastic modulus was small, and polyketone fibers showing a high tensile strength and a high tensile elastic modulus were obtained.

When a yarn of the polyketone fibers obtained by drawing at a high strain rate was twisted for 3 hours, the number of fluffs formed was 0/100 m. Moreover, when the fatigue resistance of the yarn subsequent to twisting was evaluated, the tensile strength retention was 65%, and a yarn showing a high fatigue resistance was obtained. The fatigue resistance was higher than that of the yarn in Example 1.

EXAMPLE 4

The procedure of Example 1 was repeated except that a polyketone having an intrinsic viscosity of 8.6 dl/g and containing 18 ppm of palladium was used, and that the polyketone concentration was made 6.5% by weight.

The phase separation temperature of the polyketone solution was 37° C., and $A_{min}(S)$ was 0.19.

In drawing at a high strain rate, no yarn breakage was observed. The number of fluffs formed by single filament breakage was 2/10,000 m, and the results were good. As a result of measuring a UV absorption spectrum of the fibers thus obtained, $A_{min}(F)$ was found to be 0.22. Moreover, the fibers had a size of 267 dtex/250 filaments, and showed a tensile strength of 20.8 cN/dtex, a tensile elongation of 5.2%, a tensile elastic modulus of 518 cN/dtex and a variation in the tensile strength of 0.22. Furthermore, the tensile strength retention in evaluating a heat resistance was as good as 83%.

As a result of measuring a UV absorption spectrum of the fibers obtained by drawing at a low strain rate, $A_{min}(F)$ was found to be 0.25. Moreover, the fibers had a size of 263 dtex/250 filaments, and showed a tensile strength of 22.4 cN/dtex, a tensile elongation of 4.8%, a tensile elastic modulus of 532 cN/dtex and a variation in the tensile strength of 0.18. No fluffs were observed. Furthermore, the tensile strength retention in evaluating a heat resistance was as good as 82%.

In comparison with drawing at a low strain rate, even when drawing the polyketone was conducted at a high strain rate, lowering of the tensile strength and tensile elastic modulus was small, and polyketone fibers showing a high tensile strength and a high tensile elastic modulus were obtained.

When a yarn of the polyketone fibers obtained by drawing at a high strain rate was twisted for 3 hours, the number of fluffs formed was 0/100 m. Moreover, when the fatigue resistance of the yarn subsequent to twisting was evaluated, the tensile strength retention was 58%, and a yarn showing a high fatigue resistance was obtained.

EXAMPLE 5

The procedure of Example 1 was repeated except that the polyketone solution was not heated in tubing, and that the polyketone solution was extruded at 50° C. through a spinneret. The dissolution step was carried out at 50° C. for 6 hours. The polyketone solution was quantitatively fed from a dissolver with a gear pump, and filtered at 50° C. with a 20-μm filter (filtering step being carried out at 50° C. for 30 minutes). After filtering, a step of injecting the polyketone solution through a spinneret (heating step and injection step) was carried out at 50° C. for 45 minutes. S was therefore from 0.24 to 0.27. The phase separation temperature was 42° C., and $A_{min}(S)$ was 0.17.

In drawing at a high strain rate, no yarn breakage was observed. The number of fluffs formed by single filament breakage was 0/10,000 m, and the results were better than those in Example 1. As a result of measuring a UV absorption spectrum of the fibers thus obtained, $A_{min}(F)$ was found to be 0.18. Moreover, the fibers had a size of 306 dtex/250 filaments, and showed a tensile strength of 16.4 cN/dtex, a tensile elongation of 5.2%, a tensile elastic modulus of 415 cN/dtex and a variation in the tensile strength of 0.10. Furthermore, the tensile strength retention in evaluating a heat resistance was as good as 85%.

As a result of measuring a UV absorption spectrum of the fibers obtained by drawing at a low strain rate, $A_{min}(F)$ was found to be 0.18. Moreover, the fibers had a size of 305 dtex/250 filaments, and showed a tensile strength of 16.6 cN/dtex, a tensile elongation of 4.8%, a tensile elastic modulus of 420 cN/dtex and a variation in the tensile strength of 0.06. No fluffs were observed. Furthermore, the tensile strength retention in evaluating a heat resistance was 83%.

In comparison with drawing at a low strain rate, even when drawing the polyketone was conducted at a high strain rate, lowering of the tensile strength and tensile elastic modulus was small, and polyketone fibers showing a high tensile strength and a high tensile elastic modulus were obtained. However, when the results were compared with those in Example 1, the tensile strength and tensile elastic modulus were slightly low.

When a yarn of the polyketone fibers obtained by drawing at a high strain rate was twisted for 3 hours, the number of fluffs formed was 0/100 m. Moreover, when the fatigue resistance of the yarn subsequent to twisting was evaluated, the tensile strength retention was 58%, and a yarn showing a high fatigue resistance was obtained.

EXAMPLE 6

The procedure of Example 1 was repeated except that an aqueous solution in which the mass ratio of zinc chloride/calcium chloride/water was 57.5/17.5/25 was used as a solvent. In addition, the phase separation temperature of the polyketone solution was not observed in a temperature range of 0 to 250° C. $A_{min}(S)$ was 0.19.

During drawing at a high strain rate, no yarn breakage was observed. The number of fluffs formed by single filament breakage was 2/10,000 m. As a result of measuring a UV absorption spectrum of the fibers thus obtained, $A_{min}(F)$ was found to be 0.21. Moreover, the fibers had a size of 306 dtex/250 filaments, and showed a tensile strength of 15.6 cN/dtex, a tensile elongation of 5.6%, a tensile elastic modulus of 380 cN/dtex and a variation in the tensile strength of 0.15. Furthermore, the tensile strength retention in evaluating heat resistance was as good as 84%.

As a result of measuring a UV absorption spectrum of the fibers thus obtained by drawing at a low strain rate, $A_{min}(F)$ was found to be 0.26. Moreover, the fibers had a size of 305 dtex/250 filaments, and showed a tensile strength of 16.2 cN/dtex, a tensile elongation of 4.8%, a tensile elastic modulus of 400 cN/dtex and a variation in the tensile strength of 0.10. No fluffs were observed. Furthermore, the tensile strength retention in evaluating a heat resistance was 83%.

In comparison with drawing at a low strain rate, even when drawing the polyketone was conducted at a high strain rate, lowering of the tensile strength and tensile elastic modulus was small, and polyketone fibers showing a high tensile strength and a high tensile elastic modulus were obtained. However, the tensile strength and the tensile elastic modulus were slightly low in comparison with those in Example 1.

When a yarn of the polyketone fibers obtained by drawing at a high strain rate was twisted for 3 hours, the number of fluffs formed was 0/100 m. Moreover, when the fatigue resistance of the yarn subsequent to twisting was evaluated, the tensile strength retention was 52%, and a yarn showing a high fatigue resistance was obtained. However, the fatigue resistance was lower than that of the yarn in Example 1.

EXAMPLE 7

The procedure of Example 2 was repeated except that an aqueous solution in which the mass ratio of zinc chloride/sodium chloride/water was 65/10/25 was used as a solvent. In addition, the phase separation temperature of the polyketone solution was not observed in a temperature range of 0 to 250° C. Moreover, $A_{min}(S)$ was 0.45.

During drawing at a high strain rate, no yarn breakage was observed. The number of fluffs formed by single filament breakage was 9/10,000 m. As a result of measuring a UV absorption spectrum of the fibers thus obtained, $A_{min}(F)$ was found to be 0.46. Moreover, the fibers had a size of 303 dtex/250 filaments, and showed a tensile strength of 12.8 cN/dtex, a tensile elongation of 4.8%, a tensile elastic modulus of 350 cN/dtex and a variation in the tensile strength as small as 0.23. The tensile strength and tensile elastic modulus were slightly low. Furthermore, the tensile strength retention in evaluating a heat resistance was as excellent as 78%.

As a result of measuring a UV absorption spectrum of the fibers thus obtained by drawing at a low strain rate, $A_{min}(F)$ was found to be 0.49. Moreover, the fibers had a size of 305 dtex/250 filaments, and showed a tensile strength of 14.5 cN/dtex, a tensile elongation of 4.9%, a tensile elastic modulus of 380 cN/dtex and a variation in the tensile strength as small as 0.20. Furthermore, the tensile strength retention in evaluating a heat resistance was as excellent as 77%.

In comparison with drawing at a low strain rate, even when drawing the polyketone was conducted at a high strain rate, lowering of the tensile strength and tensile elastic modulus was small, and polyketone fibers showing a high tensile strength and a high tensile elastic modulus were obtained.

When a yarn of the polyketone fibers obtained by drawing at a high strain rate was twisted for 3 hours, the number of fluffs formed was 0/100 m. Moreover, when the fatigue resistance of the yarn subsequent to twisting was evaluated, the tensile strength retention was 50%.

EXAMPLE 8

The procedure of Example 2 was repeated except that the polyketone obtained in Reference Example 2 was used. In addition, the phase separation temperature of the polyketone solution was 41° C. Moreover, $A_{min}(S)$ was 0.46.

During drawing at a high strain rate, no yarn breakage was observed. The number of fluffs formed by single filament breakage was 10/10,000 m. As a result of measuring a UV absorption spectrum of the fibers thus obtained, $A_{min}(F)$ was found to be 0.48. Moreover, the fibers had a size of 310 dtex/250 filaments, and showed a tensile strength of 16.2 cN/dtex, a tensile elongation of 4.9%, a tensile elastic modulus of 415 cN/dtex and a variation in the tensile strength of 0.33. Furthermore, the tensile strength retention in evaluating a heat resistance was as excellent as 76%.

As a result of measuring a UV absorption spectrum of the fibers thus obtained by drawing at a low strain rate, $A_{min}(F)$ was found to be 0.50. Moreover, the fibers had a size of 308 dtex/250 filaments, and showed a tensile strength of 16.3 cN/dtex, a tensile elongation of 4.7%, a tensile elastic modulus of 445 cN/dtex and a variation in the tensile strength as small as 0.28. Furthermore, the tensile strength retention in evaluating a heat resistance was as excellent as 75%.

In comparison with drawing at a low strain rate, even when drawing the polyketone was conducted at a high strain rate, lowering of the tensile strength and tensile elastic modulus was small, and polyketone fibers showing a high tensile strength and a high tensile elastic modulus were obtained.

When a yarn of the polyketone fibers obtained by drawing at a high strain rate was twisted for 3 hours, the number of fluffs formed was 1/100 m. Moreover, when the fatigue resistance of the yarn subsequent to twisting was evaluated, the tensile strength retention was 51%.

EXAMPLE 9

The procedure of Example 2 was repeated except that hot drawing was conducted by two stages (draw ratio of the first stage: 6.3, draw ratio of the second stage: 8.8) with the total draw ratio of 8.8. In addition, the phase separation temperature of the polyketone solution was 42° C. Moreover, $A_{min}(S)$ was 0.35.

In drawing at a high strain rate, the drawing conditions at the first stage were as follows: the yarn was passed through a heating furnace 5 m long at 240° C., and drawn (draw ratio of 6.3) between two pairs of rolls (drawing speed in the first pair of rolls: 20 m/min; drawing speed in the second pair of rolls: 126 m/min); the strain rate was 0.35 sec$^{-1}$. The drawing conditions at the second stage were as follows: the yarn was passed through a heating furnace 5 m long at 255° C., and drawn (draw ratio of 1.4) between two pairs of rolls (drawing speed in the first pair of rolls: 126 m/min; drawing speed in the second pair of rolls: 176 m/min); the strain rate was 0.17 sec$^{-1}$.

Furthermore, in drawing at a low strain rate, a yarn after drying was once wound, and a first and a second stage hot drawing were conducted at a low strain rate. The total draw ratio was 8.8 that was the same as that in hot drawing at a high strain rate. The drawing conditions at the first stage were as follows: the yarn was passed through a heating furnace 5 m long at 240° C., and drawn (draw ratio of 6.3) between two pairs of rolls (drawing speed in the first pair of rolls: 10 m/min; drawing speed in the second pair of rolls: 63 m/min); the strain rate was 0.18 sec$^{-1}$. The drawing conditions at the second stage were as follows: the yarn was passed through a heating furnace 5 m long at 255° C., and drawn (draw ratio of 1.4) between two pairs of rolls (drawing speed in the first pair of rolls: 63 m/min; drawing speed in the second pair of rolls: 88 m/min); the strain rate was 0.08 sec$^{-1}$.

During drawing at a high strain rate, no yarn breakage was observed. The number of fluffs formed by single filament breakage was 0/10,000 m. As a result of measuring a UV absorption spectrum of the fibers thus obtained, $A_{min}(F)$ was found to be 0.36. Moreover, the fibers had a size of 578 dtex/250 filaments, and showed a tensile strength of 12.5 cN/dtex, a tensile elongation of 6.7%, a tensile elastic modulus of 200 cN/dtex and a variation in the tensile strength of 0.04. Furthermore, the tensile strength retention in evaluating a heat resistance was as good as 80%.

As a result of measuring a UV absorption spectrum of the fibers thus obtained during drawing at a low strain rate, $A_{min}(F)$ was found to be 0.36. Moreover, the fibers had a size of 575 dtex/250 filaments, and showed a tensile strength of 12.6 cN/dtex, a tensile elongation of 6.5%, a tensile elastic modulus of 210 cN/dtex and a variation in the tensile strength of 0.04. No fluffs were observed. Furthermore, the tensile strength retention in evaluating a heat resistance was as good as 76%.

In comparison with drawing at a low strain rate, even when drawing the polyketone was conducted at a high strain rate, lowering of the tensile strength and tensile elastic modulus was small.

EXAMPLE 10

The procedure of Example 2 was repeated except that the polyketone was cleaned, on a Nelson roll, with water alone. When the amounts of metal elements of zinc, calcium and lithium remaining in the fibers were measured, the total amount thereof was 600 ppm. In addition, the phase separation temperature of the polyketone solution was 42° C. Moreover, $A_{min}(S)$ was 0.36.

During drawing at a high strain rate, no yarn breakage was observed. The number of fluffs formed by single filament breakage was 9/10,000 m. As a result of measuring a UV absorption spectrum of the fibers thus obtained, $A_{min}(F)$ was found to be 0.38. Moreover, the fibers had a size of 309 dtex/250 filaments, and showed a tensile strength of 11.8 cN/dtex, a tensile elongation of 4.7%, a tensile elastic modulus of 330 cN/dtex and a variation in the tensile strength of 0.35. The tensile strength and tensile elastic modulus were low in comparison with those in Example 2. The tensile strength retention in evaluating a heat resistance was as good as 75%.

As a result of measuring a UV absorption spectrum of the fibers thus obtained during drawing at a low strain rate, $A_{min}(F)$ was found to be 0.39. Moreover, the fibers had a size of 307 dtex/250 filaments, and showed a tensile strength of 12.3 cN/dtex, a tensile elongation of 4.5%, a tensile elastic modulus of 354 cN/dtex and a variation in the tensile strength of 0.20. No fluffs were observed. Furthermore, the tensile strength retention in evaluating a heat resistance was 76%.

In comparison with drawing at a low strain rate, even when drawing the polyketone was conducted at a high strain rate, lowering of the tensile strength and tensile elastic modulus was small.

When a yarn of the polyketone fibers obtained by drawing at a high strain rate was twisted for 3 hours, the number of fluffs formed was 1/100 m. Moreover, when the fatigue resistance of the yarn subsequent to twisting was evaluated, the tensile strength retention was 52%, and a yarn showing a good fatigue resistance was obtained. However, the fatigue resistance was lower than that in Example 2.

COMPARATIVE EXAMPLE 1

An aqueous solution in which the mass ratio of zinc chloride/lithium chloride/calcium chloride/water was 22/10/30/38 was heated to 80° C. in a dissolver that was higher than in Example 1 by 30° C., and the polyketone obtained in Reference Example 1 was added to the aqueous solution so that the polymer concentration reached 7.5% by weight. The resultant mixture was stirred for 2 hours while being defoamed, by evacuating to a pressure of 6.7 kPa to give a homogenous transparent polyketone solution (dissolution step).

Part of the polyketone solution was transferred to a sample cell, and the light transmittance was measured while the solution temperature was being cooled from 85° C. at a rate of 10° C./hour. The phase separation temperature of the polyketone solution was 42° C.

The polyketone solution thus obtained was quantitatively fed to the next step from the dissolver with a gear pump while being held at 80° C. in the dissolver, and filtered at 80° C. with a 20-μm filter (filtering step). The residence time during the step was 30 minutes.

Next, the polyketone solution was injected at 80° C. through a spinneret having 250 nozzles each having a diameter of 0.18 mm from a tubing at a speed of 13.9 m/min while being held at 80° C. (heating step and injection step). The residence time during the steps was 45 minutes.

The procedures of coagulation, cleaning, drying and drawing subsequent to injection were carried out in the same manner as in Example 1.

During drawing at a high strain rate, no yarn breakage was observed. However, the number of fluffs formed by single filament breakage was 78/10,000 m; the number was considerably larger than that in Example 1. As a result of measuring a UV absorption spectrum of the fibers thus obtained, $A_{min}(F)$ was found to be 0.63. Moreover, the fibers had a size of 306 dtex/250 filaments, and showed a tensile strength of 14.2 cN/dtex, a tensile elongation of 5.0%, a tensile elastic modulus of 317 cN/dtex and a variation in the tensile strength as large as 0.44. Moreover, the tensile strength retention in evaluating a heat resistance was 72%. The tensile strength retention was low in comparison with that in Example 1.

Because the above evaluation of spinning was performed from 1 to 2 hours after dissolving the polyketone, the corresponding S was then from 1.19 to 1.47.

After finishing the evaluation of spinning (2 hours after dissolution), a polyketone solution injected through the spinneret was sampled. As a result of measuring a UV absorption spectrum of the polyketone, $A_{min}(S)$ was found to be 0.59.

Figure 2:
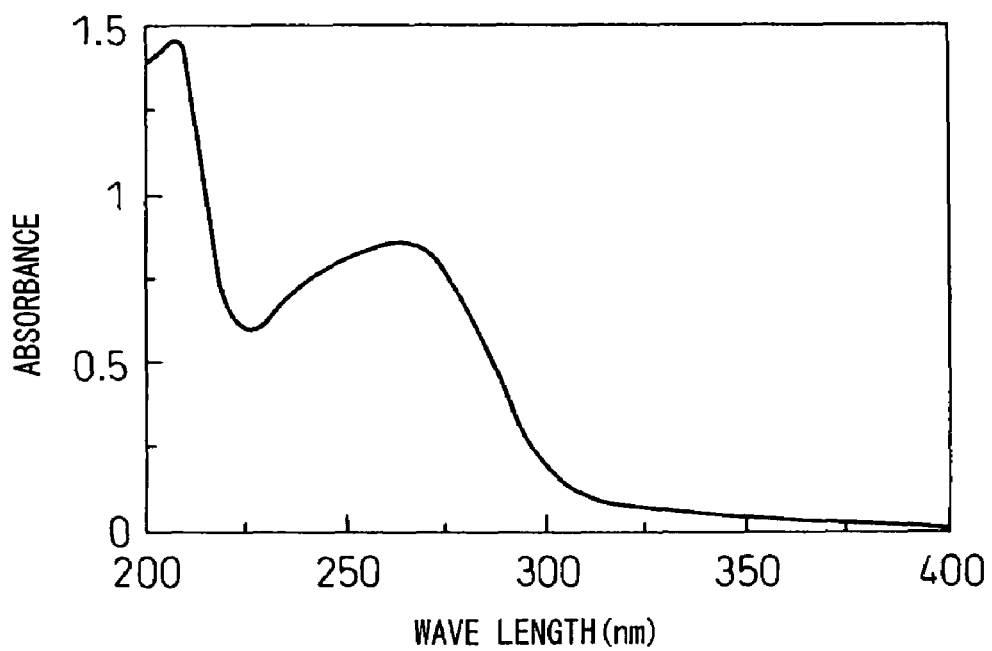
FIG. 2 shows a UV absorption spectrum of polyketone fibers obtained by four-stage drawing at a low strain rate in Comparative Example 1.

As a result of measuring a UV absorption spectrum of the fibers thus obtained during drawing at a low strain rate, $A_{min}(F)$ was found to be 0.61. FIG. 2 shows a UV absorption spectrum of the fibers.

Moreover, the fibers had a size of 301 dtex/250 filaments, and showed a tensile strength of 17.6 cN/dtex, a tensile elongation of 4.7%, a tensile elastic modulus of 400 cN/dtex and a variation in the tensile strength as large as 0.37. Furthermore, the tensile strength retention in evaluating a heat resistance was as low as 71%.

In comparison with drawing at a low strain rate, even when drawing the polyketone was conducted at a high strain rate, lowering of the tensile strength and tensile elastic modulus was significant. Moreover, the tensile strength and tensile elastic modulus were slightly low in comparison with those in Example 1.

When a yarn of the polyketone fibers obtained by drawing at a high strain rate was twisted for 3 hours, the number of fluffs formed was 3/100 m. Moreover, when the fatigue resistance of the yarn subsequent to twisting was evaluated, the tensile strength retention was as low as 45%.

COMPARATIVE EXAMPLE 2

An aqueous solution in which the mass ratio of zinc chloride/lithium chloride/calcium chloride/water was 22/10/30/38 was heated to 85° C. in a dissolver, and the polyketone obtained in Reference Example 1 was added to the solution so that the polymer concentration reached 7.5% by weight. The resultant mixture was stirred for 2 hours while being defoamed, by evacuating to a pressure of 6.7 kPa, to give a homogenous transparent polyketone solution (dissolution step).

Part of the polyketone solution was transferred to a sample cell, and the light transmittance was measured while the solution temperature was being cooled from 85° C. at a rate of 10° C./hour. The phase separation temperature of the polyketone solution was 42° C.

The polyketone solution thus obtained was quantitatively fed to the next step from the dissolver with a gear pump while being held at 85° C. in the dissolver, and filtered at 85° C. with a 20-μm filter (filtering step). The residence time during the step was 30 minutes.

Next, the polyketone solution was injected at 85° C. at a speed of 13.9 m/min through a spinneret having 250 nozzles each having a diameter of 0.18 mm from tubing while the polyketone solution was being held at 85° C. (heating step and injection step). The residence time was 45 minutes.

The procedures of coagulation, cleaning, drying and drawing subsequent to injection were carried out in the same manner as in Example 1.

During drawing at a high strain rate, yarn breakage took place once at the fourth stage. The number of fluffs formed by single filament breakage was 150/10,000 m. The number increased more in comparison with that in Comparative Example 1. As a result of measuring a UV absorption spectrum of the fibers thus obtained, $A_{min}(F)$ was found to be 0.78. Moreover, the fibers had a size of 306 dtex/250 filaments, and showed a tensile strength of 13.3 cN/dtex, a tensile elongation of 4.6%, a tensile elastic modulus of 293 cN/dtex and a variation in the tensile strength as large as 0.50. Moreover, the tensile strength retention in evaluating a heat resistance was 66%. The tensile strength retention was low in comparison with that in Example 1.

Because the above evaluation of spinning was performed for 1 to 2 hours after dissolving the polyketone, S was then from 1.67 to 2.06. After finishing the evaluation of spinning (2 hours after dissolution), a polyketone solution injected from the spinneret was sampled. As a result of measuring a UV absorption spectrum of the polyketone, $A_{min}(S)$ was found to be 0.71.

As a result of measuring a UV absorption spectrum of the fibers thus obtained during drawing at a low strain rate, $A_{min}(F)$ was found to be 0.79. Moreover, the fibers had a size of 303 dtex/250 filaments, and showed a tensile strength of 16.1 cN/dtex, a tensile elongation of 4.1%, a tensile elastic modulus of 411 cN/dtex and a variation in the tensile strength as large as 0.55. Furthermore, the tensile strength retention in evaluating a heat resistance was 65%.

In comparison with drawing at a low strain rate, when drawing the polyketone was conducted at a high strain rate, lowering of the tensile strength and tensile elastic modulus was significant. Moreover, the tensile strength and tensile elastic modulus were slightly low in comparison with those in Example 1.

When a yarn of the polyketone fibers obtained by drawing at a high strain rate was twisted for 3 hours, the number of fluffs formed was 6/100 m. Moreover, when the fatigue resistance of the yarn subsequent to twisting was evaluated, the tensile strength retention was as low as 41%.

COMPARATIVE EXAMPLE 3

The procedure of Comparative Example 1 was repeated except that an aqueous solution in which the mass ratio of zinc chloride/sodium chloride/water was 65/10/25 was used as a solvent. In addition, the phase separation temperature of the polyketone solution was not observed in a temperature range of 0 to 250° C. Moreover, $A_{min}(S)$ was 0.70.

During drawing at a high strain rate, yarn breakage took place twice at the fourth drawing stage. The number of fluffs formed by single filament breakage was as many as 300/10, 000 m. As a result of measuring a UV absorption spectrum of the fibers thus obtained, $A_{min}(F)$ was found to be 0.78. Moreover, the fibers had a size of 305 dtex/250 filaments, and showed a tensile strength of 10.2 cN/dtex, a tensile elongation of 4.5%, a tensile elastic modulus of 315 cN/dtex and a variation in the tensile strength as large as 0.63. Furthermore, the tensile strength retention in evaluating a heat resistance was as low as 65%.

As a result of measuring a UV absorption spectrum of the fibers thus obtained during drawing at a low strain rate, $A_{min}(F)$ was found to be 0.75. Moreover, the fibers had a size of 305 dtex/250 filaments, and showed a tensile strength of 15.6 cN/dtex, a tensile elongation of 4.8%, a tensile elastic modulus of 380 cN/dtex and a variation in the tensile strength as large as 0.60. Furthermore, fluffs were observed. Still furthermore, the tensile strength retention in evaluating a heat resistance was as low as 64%.

In comparison with drawing at a low strain rate, when drawing the polyketone was conducted at a high strain rate, lowering of the tensile strength and tensile elastic modulus was significant.

When a yarn of the polyketone fibers obtained by drawing at a high strain rate was twisted for 3 hours, the number of fluffs formed was 9/100 m. Moreover, when the fatigue resistance of the yarn subsequent to twisting was evaluated, the tensile strength retention was as low as 35%.

COMPARATIVE EXAMPLE 4

The procedure of Comparative Example 1 was repeated except that the polymer obtained in Reference Example 2 was used. In addition, the phase separation temperature of the polyketone solution was 40° C. Moreover, $A_{min}(S)$ was 0.65.

During drawing at a high strain rate, yarn breakage took place once at the fourth drawing stage. The number of fluffs formed by single filament breakage was as many as 200/10,000 m. As a result of measuring a UV absorption spectrum of the fibers thus obtained, $A_{min}(F)$ was found to be 0.69. Moreover, the fibers had a size of 308 dtex/250 filaments, and showed a tensile strength of 12.8 cN/dtex, a tensile elongation of 4.8%, a tensile elastic modulus of 300 cN/dtex and a variation in the tensile strength as large as 0.65. Furthermore, the tensile strength retention in evaluating a heat resistance was as low as 62%.

As a result of measuring a UV absorption spectrum of the fibers thus obtained during drawing at a low strain rate, $A_{min}(F)$ was found to be 0.71. Moreover, the fibers had a size of 306 dtex/250 filaments, and showed a tensile strength of 15.3 cN/dtex, a tensile elongation of 4.7%, a tensile elastic modulus of 380 cN/dtex and a variation in the tensile strength as large as 0.62. Fluffs were observed slightly. Furthermore, the tensile strength retention in evaluating a heat resistance was as low as 59%.

In comparison with drawing at a low strain rate, when the polyketone was drawn at a high strain rate, lowering of the tensile strength and tensile elastic modulus was significant.

When a yarn of the polyketone fibers obtained by drawing at a high strain rate was twisted for 3 hours, the number of fluffs formed was as many as 13/100 m. Moreover, when the fatigue resistance of the yarn subsequent to twisting was evaluated, the tensile strength retention was as low as 35%.

COMPARATIVE EXAMPLE 5

Hexafluoroisopropanol as a solvent was heated to 40° C. in a dissolver. The polyketone obtained in Reference Example 1 was added to the solvent so that the polymer concentration reached 7.5% by weight, and the contents were stirred for 6 hours to give a homogenous transparent polyketone solution. In addition, the phase separation temperature of the polyketone solution was not observed in a temperature range of 0 to 250° C.

The polyketone solution thus obtained was quantitatively fed to the next step from the dissolver with a gear pump while being held at 40° C. in the dissolver, and filtered at 40° C. with a 20-μm filter. The polyketone solution was then injected at 40° C. at a speed of 5 m/minutes through a spinneret having 50 nozzles each having a diameter of 0.15 mm into acetone. The residence period from the dissolver to the outlet of the spinneret was 90 minutes. Because the polyketone solution was injected from 1 to 2 hours after dissolution, S was from 0.11 to 0.12.

Next, the injected yarn was passed through an acetone bath at a speed of 5 m/min to be cleaned, wound, and dried. The resultant yarn contained 3.3% by weight of hexafluoroisopropanol. Using a heating tube in a nitrogen atmosphere, the yarn was hot drawn at 220° C. (draw ratio of 9), at 240° C. (draw ratio of 2) and at 267° C. (draw ratio of 1.23). The total draw ratio of the yarn was therefore 22. The strain rates were all 0.02 sec$^{-1}$.

The fibers thus obtained had a size of 47 dtex/50 filaments, and showed a tensile strength of 15.7 cN/dtex, a tensile elongation of 4.1%, a tensile elastic modulus of 350 cN/dtex and a variation in the tensile strength as large as 0.64. Moreover many fluffs were observed. Furthermore, the tensile strength retention in evaluating a heat resistance was as significantly low as 43%.

Furthermore, a polyketone solution injected through the spinneret was sampled, and the sampled solution was dried by evacuation at room temperature so that hexafluoropropanol was removed. As a result of measuring a UV absorption spectrum of the polyketone, $A_{min}(S)$ was found to be 0.16. However, as a result of measuring a UV absorption spectrum of fibers after hot drawing, $A_{min}(F)$ was found to be as high as 0.67.

EXAMPLE 11

Polyketone fibers were obtained by the same drawing procedure at a high strain rate as in Example 1. Five yarns of the fibers thus obtained were doubled, and the resultant yarn was first twisted and second twisted both at a rate of 90 T/m to give a twisted yarn cord. The twisted yarn cord was treated with a resorcin-formalin-latex solution (22 parts by weight of resorcin, 30 parts by weight of an aqueous 30 wt. % formalin solution, 14 parts by weight of an aqueous 10 wt. % NaOH solution, 570 parts by weight of water and 41 parts by weight of vinylpyridine latex) to give an RFL-treated cord.

The RFL-treated cord thus obtained was used as a tire cord, and a radial tire was prepared. The radial tire thus obtained was subjected to the following rotary test for 96 hours: assuming that a 1-ton passenger car is driving on an asphalt surface at a speed of 200 km/hour, the radial tire was contacted with an asphalt surface at 35° C. while the same contact pressure as that applied to the above passenger car tire was being applied thereto, and rotated at the same rotation speed as that of the above passenger car tire.

The tire cords were taken out from the tested tire after testing for 96 hours, and the tensile strength of the tire cords was measured. The tensile strength retention of the tire cords based on the tensile strength of the RFL-treated tire cords prior to the tire rotary test was approximately 100%.

By way of comparison, five yarns of fibers obtained by the same drawing procedure at a high strain rate as in Comparative Example 1 were doubled, and the resultant yarn was subjected to the same test as mentioned above. The tire cords showed a tensile strength retention of 85%. That is, the tensile strength subsequent to the tire rotary test was greatly lowered.

EXAMPLE 12

Twisted yarn cords obtained in the same manner as in Example 11 were treated with an epoxy resin so that the coating resin amount reached 5% by weight, dried at 230° C., and heat treated. Using the treated cords thus obtained, a V-belt 1,016 mm long to which B type cog wheels were attached was conventionally prepared from a compressed rubber layer that was composed of a piece of upper sailcloth and a chloroprene rubber, and a piece of lower sailcloth.

The V-belt was passed between two pulleys, and rotated at 2,000 rpm for 24 hours. After the test, the treated cords were taken out, and the tensile strength was measured. The tensile strength retention was approximately 100% based on the tensile strength after the epoxy treatment and prior to the test.

By way of comparison, five yarns of the fibers obtained by the same drawing procedure at a high strain rate as in Comparative Example 1 were doubled, and the resultant yarn was subjected to the same test. The tensile strength retention was 89%. That is, the tensile strength retention was greatly lowered.

Table 2 lists the results of Examples 1 to 6, and Table 3 lists the results of Examples 7 to 10. Moreover, Table 4 lists the results of Comparative Examples 1 to 5. In addition, each arrow← in Tables 2 to 4 indicates that the numerical value in the column is the same as that in the adjacent left column.

TABLE 1

|  | Elapsed period (min) | Temp. (° C.) | $T_t$ (K) | (S) (every minute) | S (total) |
|---|---|---|---|---|---|
| Dissolution step | 0 | 50 | $T_1 = 323$ | 0.000493 | 0.1775 |
|  | 1 | 50 | $T_2 = 323$ | 0.000493 |  |
|  | 2 | 50 | $T_{360} = 323$ | 0.000493 |  |
| Filtering step | 360 | 50 |  |  |  |
|  | 361 | 50 | $T_{361} = 323$ | 0.000493 | 0.0148 |
|  | 390 | 50 | $T_{390} = 323$ | 0.000493 |  |
| Heating step | 390 | 50 | $T_{391} = 323.5$ | 0.000513 | 0.05740 |
|  | 391 | 51 |  |  |  |
|  | 392 | 52 | $T_{392} = 324.5$ | 0.000557 |  |
|  | 393 | 53 | $T_{393} = 325.5$ | 0.000604 |  |
|  | 394 | 54 | $T_{394} = 326.5$ | 0.000654 |  |
|  | 395 | 55 | $T_{395} = 327.5$ | 0.000709 |  |
|  |  |  | $T_{396} = 328.5$ | 0.000768 |  |

TABLE 1-continued

|  | Elapsed period (min) | Temp. (° C.) | $T_t$ (K) | (S) (every minute) | S (total) |
|---|---|---|---|---|---|
|  | 396 | 56 | $T_{397} = 329.5$ | 0.000831 |  |
|  | 397 | 57 | $T_{398} = 330.5$ | 0.000898 |  |
|  | 398 | 58 | $T_{399} = 331.5$ | 0.000971 |  |
|  | 399 | 59 | $T_{400} = 332.5$ | 0.001050 |  |
|  | 400 | 60 | $T_{401} = 333.5$ | 0.001134 |  |
|  | 401 | 61 | $T_{402} = 334.5$ | 0.001224 |  |
|  | 402 | 62 | $T_{403} = 335.5$ | 0.001321 |  |
|  | 403 | 63 | $T_{404} = 336.5$ | 0.001425 |  |
|  | 404 | 64 | $T_{405} = 337.5$ | 0.001536 |  |
|  | 405 | 65 | $T_{406} = 338.5$ | 0.001655 |  |
|  | 406 | 66 | $T_{407} = 339.5$ | 0.001783 |  |
|  | 407 | 67 | $T_{408} = 340.5$ | 0.001920 |  |
|  | 408 | 68 | $T_{409} = 341.5$ | 0.002067 |  |
|  | 409 | 69 | $T_{410} = 342.5$ | 0.002223 |  |
|  | 410 | 70 | $T_{411} = 343.5$ | 0.002391 |  |
|  | 411 | 71 | $T_{412} = 344.5$ | 0.002570 |  |
|  | 412 | 72 | $T_{413} = 345.5$ | 0.002761 |  |
|  | 413 | 73 | $T_{414} = 346.5$ | 0.002965 |  |
|  | 414 | 74 | $T_{415} = 347.5$ | 0.003184 |  |
|  | 415 | 75 | $T_{416} = 348.5$ | 0.003416 |  |
|  | 416 | 76 | $T_{417} = 349.5$ | 0.003665 |  |
|  | 417 | 77 | $T_{418} = 350.5$ | 0.003930 |  |
|  | 418 | 78 | $T_{419} = 351.5$ | 0.004212 |  |
|  | 419 | 79 | $T_{420} = 352.5$ | 0.004513 |  |
|  | 420 | 80 |  |  |  |
| Injection step | 421 | 80 | $T_{421} = 353$ | 0.004670 | 0.07005 |
|  | 435 | 80 | $T_{435} = 353$ | 0.004670 |  |
| S in total in entire steps |  |  |  |  | 0.32 |

TABLE 2

|  | Ex. 1 | Ex. 2 | Ex. 3 | Ex. 4 | Ex. 5 | Ex. 6 |
|---|---|---|---|---|---|---|
| Solvent composition (weight ratio) | $ZnCl_2/LiCl/CaCl_2$/water = 22/10/30/38 | ← | ← | ← | ← | $ZnCl_2/CaCl_2$/water = 57.5/17.5/25 |
| Polymer concn. wt. % | 7.5 | ← | ← | 6.5 | 7.5 | ← |
| Intrinsic viscosity [η] dl/g | 5.5 | 5.5 | 5.5 | 8.6 | 5.5 | 5.5 |
| Palladium content in polymer ppm | 25 | 25 | 25 | 18 | 25 | 25 |
| Dissolution step conditions (temp./period) | 50° C./6 hr | 60° C./6 hr | 50° C./30 min | 50° C./6 hr | ← | ← |
| Filtering step conditions (temp./period) | 50° C./30 min | 60° C./30 min | 50° C./30 min | ← | ← | ← |

TABLE 2-continued

|  | Ex. 1 | Ex. 2 | Ex. 3 | Ex. 4 | Ex. 5 | Ex. 6 |
|---|---|---|---|---|---|---|
| Heating step conditions (temp./period) | 50→80° C./30 min | 60→80° C./20 min | 50→80° C./30 min | ← | No temp. rise/30 min | 50→80° C./30 min |
| Injection step conditions (temp./period) | 80° C./15 min | ← | ← | ← | 50° C./15 min | 80° C./30 min |
| Phase separation temp. ° C. | 42 | 42 | 42 | 37 | 42 | Not observed |
| $A_{min}$ (S) | 0.20 | 0.36 | 0.15 | 0.19 | 0.17 | 0.19 |
| S | 0.35–0.38 | 0.61–0.68 | 0.16 | 0.35–0.38 | 0.24–0.27 | 0.35–0.38 |
| Drawing at high strain rate |  |  |  |  |  |  |
| Total draw ratio | 16.4 | ← | ← | ← | ← | ← |
| $A_{min}$ (F) | 0.24 | 0.37 | 0.17 | 0.22 | 0.18 | 0.21 |
| Yarn breakage times | 0 | 0 | 0 | 0 | 0 | 0 |
| Fluff formation number/10,000 m | 2 | 7 | 0 | 2 | 0 | 2 |
| Tensile strength cN/dtex | 18.2 | 17.3 | 18.9 | 20.8 | 16.4 | 15.6 |
| Tensile elastic modulus cN/dtex | 433 | 420 | 466 | 518 | 415 | 380 |
| Variation in tensile strength | 0.20 | 0.29 | 0.15 | 0.22 | 0.10 | 0.15 |
| Heat resistance (tensile strength retention) % | 83 | 79 | 90 | 83 | 85 | 84 |
| Fluff formation in twisted yarn number/100 m | 0 | 0 | 0 | 0 | 0 | 0 |
| Fatigue resistance (tensile strength retention) % | 60 | 55 | 65 | 58 | 58 | 52 |
| Metal element amt. originating from solvent remaining in fibers ppm | — | 60 | — | — | — | — |
| Drawing at low strain rate |  |  |  |  |  |  |
| Total draw ratio | 16.4 | ← | ← | ← | ← | ← |
| $A_{min}$ (F) | 0.27 | 0.37 | 0.19 | 0.25 | 0.18 | 0.26 |
| Tensile strength cN/dtex | 18.9 | 18.8 | 19.3 | 22.4 | 16.6 | 16.2 |
| Tensile elastic modulus cN/dtex | 471 | 468 | 477 | 532 | 420 | 400 |
| Variation in tensile strength | 0.12 | 0.22 | 0.08 | 0.18 | 0.06 | 0.10 |
| Heat resistance (tensile strength retention) % | 81 | 78 | 87 | 82 | 83 | 83 |

TABLE 3

|  | Ex. 7 | Ex. 8 | Ex. 9 | Ex. 10 |
|---|---|---|---|---|
| Solvent composition (wt. ratio) | $ZnCl_2$/NaCl/water = 65/10/25 | $ZnCl_2$/LiCl/$CaCl_2$/water = 22/10/30/38 | ← | ← |
| Polymer concn. wt % | 7.5 | ← | ← | ← |
| Intrinsic viscosity [η] dl/g | 5.5 | 5.0 | 5.5 | 5.5 |
| Palladium content in polymer ppm | 25 | 52 | 25 | 25 |
| Dissolution step conditions (temp./period) | 60° C./6 hr | ← | ← | ← |
| Filtering step conditions (temp./period) | 60° C./30 min | ← | ← | ← |
| Heating step conditions (temp./period) | 60→80° C./20 min | ← | ← | ← |
| Injection step conditions (temp./period) | 80° C./15 min | ← | ← | ← |
| Phase separation temp. ° C. | Not observed | 41 | 42 | 42 |
| $A_{min}$ (S) | 0.45 | 0.46 | 0.35 | 0.36 |
| S | 0.61–0.68 | ← | ← | ← |
| Drawing at high strain rate |  |  |  |  |
| Total draw ratio | 16.4 | ← | 8.8 | 16.4 |
| $A_{min}$ (F) | 0.46 | 0.48 | 0.36 | 0.38 |
| Yarn breakage times | 0 | 0 | 0 | 0 |
| Fluff formation number/10,000 m | 9 | 10 | 0 | 9 |
| Tensile strength cN/dtex | 12.8 | 16.2 | 12.5 | 11.8 |
| Tensile elastic modulus | 350 | 415 | 200 | 330 |

TABLE 3-continued

|  | Ex. 7 | Ex. 8 | Ex. 9 | Ex. 10 |
|---|---|---|---|---|
| cN/dtex |  |  |  |  |
| Variation in tensile strength | 0.23 | 0.33 | 0.04 | 0.35 |
| Heat resistance (tensile strength retention) % | 78 | 76 | 80 | 75 |
| Fluff formation in twisted Yarn number/100 m | 0 | 1 | — | 1 |
| Fatigue resistance (tensile strength retention) % | 50 | 51 | — | 52 |
| Metal element amt. originating from solvent remaining in fibers ppm | — | — | — | 600 |
| Drawing at low strain rate |  |  |  |  |
| Total draw ratio | 16.4 | ← | 8.8 | 16.4 |
| $A_{min}$ (F) | 0.49 | 0.50 | 0.36 | 0.39 |
| Tensile strength cN/dtex | 14.5 | 16.3 | 12.6 | 12.3 |
| Tensile elastic modulus cN/dtex | 380 | 445 | 210 | 354 |
| Variation in tensile strength | 0.20 | 0.28 | 0.04 | 0.20 |
| Heat resistance (tensile strength retention) % | 77 | 75 | 76 | 76 |

TABLE 4

|  | C. Ex. 1 | C. Ex. 2 | C. Ex. 3 | C. Ex. 4 | C. Ex. 5 |
|---|---|---|---|---|---|
| Solvent composition (wt. ratio) | $ZnCl_2$/LiCl/ $CaCl_2$/water = 22/10/30/38 | ← | $ZnCl_2$/NaCl/ water = 65/10/25 | $ZnCl_2$/LiCl/ $CaCl_2$/water = 22/10/30/38 | Hexafluoro-isopropanol |
| Polymer concn. wt % | 7.5 | ← | ← | 7.5 | 7.5 |
| Intrinsic viscosity [η] dl/g | 5.5 | 5.5 | 5.5 | 5.0 | 5.5 |
| Palladium content in polymer ppm | 25 | 25 | 25 | 52 | 25 |
| Dissolution step conditions (temp./period) | 80° C./2 hr | 85° C./2 hr | 80° C./2 hr | ← | 40° C./6 hr |
| Filtering step conditions (temp./period) | 80° C./30 min | 85° C./30 min | 80° C./30 min | ← | 40° C./45 min |
| Heating step conditions (temp./period) | No temp. rise/30 min | No temp. rise/30 min | No temp. rise/30 min | ← | No temp. rise/30 min |
| Injection step conditions (temp./period) | 80° C./15 min | 85° C./15 min | 80° C./15 min | ← | 40° C./15 min |
| Phase separation temp. (temp./period) ° C. | 42 | 42 | Not observed | 40 | Not observed |
| $A_{min}$ (S) | 0.59 | 0.71 | 0.70 | 0.65 | 0.16 |
| S | 1.19-1.47 | 1.67-2.06 | 1.19-1.47 | 1.19-1.47 | 0.11-0.12 |
| Drawing at high strain rate |  |  |  |  |  |
| Total draw ratio | 16.4 | ← | ← | ← | — |
| $A_{min}$ (F) | 0.63 | 0.78 | 0.78 | 0.69 | — |
| Yarn breakage times | 0 | 1 | 2 | 1 | — |
| Fluff formation number/10,000 m | 78 | 150 | 300 | 200 | — |
| Tensile strength cN/dtex | 14.2 | 13.3 | 10.2 | 12.8 | — |
| Tensile elastic Modulus cN/dtex | 317 | 293 | 315 | 300 | — |
| Variation in tensile strength | 0.44 | 0.50 | 0.63 | 0.65 | — |
| Heat resistance (tensile strength retention) | 72 | 66 | 65 | 62 | — |
| Fluff formation in twisted yarn number/100 m | 3 | 6 | 9 | 13 | — |
| Fatigue resistance (tensile strength retention) | 45 | 41 | 35 | 35 | — |

TABLE 4-continued

|  | C. Ex. 1 | C. Ex. 2 | C. Ex. 3 | C. Ex. 4 | C. Ex. 5 |
|---|---|---|---|---|---|
| Drawing at low strain rate | | | | | |
| Total draw ratio | | | | | 22 |
| $A_{min}$ (F) | 0.61 | 0.79 | 0.75 | 0.71 | 0.67 |
| Tensile strength cN/dtex | 17.6 | 16.1 | 15.6 | 15.3 | 15.7 |
| Tensile elastic Modulus CN/dtex | 400 | 411 | 380 | 380 | 350 |
| Variation in tensile strength | 0.37 | 0.55 | 0.60 | 0.62 | 0.64 |
| Heat resistance (tensile strength retention) % | 71 | 65 | 64 | 59 | 43 |

Industrial Application

The polyketone fibers of the present invention show a high tensile strength, a high tensile elastic modulus and a decreased variation in the tensile strength, are excellent in a heat resistance and a fatigue resistance, and produce fewer fluffs during twisting. Moreover, because the polyketone fibers have stabilized quality and are prepared at low cost in comparison with conventional ones, they are useful as industrial materials such as a rubber-reinforcing material, a plastics-reinforcing material, a concrete-reinforcing material and a rope. For example, the polyketone fibers can be used for tires, V-belts, belts for non-stage transmissions, steam hoses, fuel hoses, radiator hoses, geotextiles, tension members, and the like. In particular, a developing application of the polyketone fibers to tires of the next generation in order to improve the fuel consumption is expected.

Furthermore, when the yarn of polyketone fibers produced by the production process of the present invention is hot drawn in a high draw ratio at a high strain rate, the number of fluffs formed by single filament breakage is small, and lowering of the tensile strength and tensile elastic modulus from those of the same yarn that is hot drawn in the same draw ratio at a low strain rate is small in comparison with conventionally prepared polyketone fibers.

The invention claimed is:

1. Polyketone fibers comprising polyketone fibers having a minimum value of a UV absorbance ($A_{min}$ (F)) observed in a wavelength region of 210 to 240 nm of 0.5 or less, said polyketone fibers being produced by a process satisfying the following (a), (b) and (c).

(a) a polyketone containing 95% by mole or more, on the basis of the total repeating units, of a repeating unit represented by the formula (1) is dissolved in an aqueous metal salt solution which contains a zinc salt and at least one metal salt other than the zinc salt selected from the group consisting of lithium, sodium, potassium, magnesium, calcium, iron, cobalt, nickel and copper to form a polyketone solution

(b) a concentration of the zinc salt in the aqueous metal salt solution is 10 to 60 wt % and (c) the above obtained polyketone solution is injected through a spinneret, wherein when a period of time from dissolving the polyketone in the aqueous metal salt solution to injecting the polyketone solution through a spinneret is divided into minutes and the arithmetic mean of a heating temperature at t-1 minutes from dissolution of the polyketone and a heating temperature at t minutes therefrom is represented by $T_t$(K), the following formula (2) is satisfied, while the polyketone in the solution injected through the spinneret has a minimum value of a UV absorbance ($A_{min}$ (S)) observed in a wavelength region of 210 to 240 nm of 0.5 or less $$S = \sum_{t=1}^{t=P} 1.53 \times 10^8 \times [\exp(-8547/T_t)] \leq 1.00 \quad (2)$$

wherein t in (2) is a natural number from 1 to P (minutes), provided that when there is a fraction of less than 1 minute in the period from dissolving the polyketone in the aqueous metal salt solution to injecting the polyketone solution through a spinneret, the fraction is eliminated with the resultant period being P.

2. The polyketone fibers according to claim 1, wherein the polyketone fibers show a tensile strength of 10 cN/dtex or more and a tensile elastic modulus of 200 cN/dtex or more.

3. The polyketone fibers according to claim 1 or 2, wherein the polyketone fibers show $A_{min}$ (F) of 0.3 or less.

4. The polyketone fibers according to claim 2, wherein the polyketone fibers show a tensile strength of 12 cN/dtex or more and a tensile elastic modulus of 250 cN/dtex or more.

5. The polyketone fibers according to claim 4, wherein the polyketone fibers show a tensile strength of 15 cN/dtex or more and a tensile elastic modulus of 300 cN/dtex or more.

6. The polyketone fibers according to claim 1 or 2, wherein the number of filaments is from 100 to 5,000, and the number of fluffs is 10 or less per 10,000 m.

7. The polyketone fibers according to claim 1 or 2, wherein the polyketone fibers show a heat-resistant tensile strength retention of 75% or more.

8. A twisted yarn cord formed out of the polyketone fibers according to claim 1 or 2, and having a twist factor K represented by the following formula of from 1,000 to 30,000:

$$K = Y \times D^{0.5}$$

wherein Y is a number of twist (T/m) per m of the twisted yarn cord, and D is the total size (dtex) of the yarn prior to twisting.

9. The twisted yarn cord according to claim 8, wherein the tensile strength is 5 cN/dtex or more.

10. A treated cord prepared by imparting a resorcin-formalin-latex resin to the twisted yarn cord according to claim 8.

11. A fiber-reinforced composite material containing the polyketone fibers according to claim 1 or 2.

12. The fiber-reinforced composite material according to claim 11, wherein the fiber-reinforced composite material is a tire or a belt.

* * * * *